United States Patent
Yamano et al.

(10) Patent No.: US 7,231,072 B2
(45) Date of Patent: Jun. 12, 2007

(54) IMAGE PROCESSING METHOD AND IMAGE CONVERTING APPARATUS

(75) Inventors: Akira Yamano, Hino (JP); Masayuki Nakazawa, Hachioji (JP)

(73) Assignee: Konica Corporation (JP)

( * ) Notice: Subject to any disclaimer, the term of this patent is extended or adjusted under 35 U.S.C. 154(b) by 849 days.

(21) Appl. No.: 10/371,794

(22) Filed: Feb. 21, 2003

(65) Prior Publication Data

US 2003/0161520 A1 Aug. 28, 2003

(30) Foreign Application Priority Data

Feb. 27, 2002 (JP) ............................. 2002-052033

(51) Int. Cl.
*G06K 9/00* (2006.01)
(52) U.S. Cl. ...................... 382/128; 382/257; 382/260; 708/313; 386/50
(58) Field of Classification Search ................ 382/128, 382/263, 257, 260; 708/313; 386/50

See application file for complete search history.

(56) References Cited

U.S. PATENT DOCUMENTS 4,777,620 A * 10/1988 Shimoni et al. ............ 382/233
5,111,285 A * 5/1992 Fujita et al. ................ 358/500

* cited by examiner

*Primary Examiner*—Vikkram Bali
*Assistant Examiner*—Anand Bhatnagar
(74) *Attorney, Agent, or Firm*—Cantor Colburn LLP

(57) ABSTRACT

There is described an image processing method and an image converting apparatus for performing the image processing for recording the medical image information. The apparatus includes an image converting section to convert the image in respect to the original image signals; an image feature extracting section to extract image features for every pixel included in the plurality of pixels in respect to the original image signals; a sharpness information obtaining section to obtain sharpness information from the image converting section; a sharpness calculating section to calculate correlation between the image features and the sharpness information; and a frequency processing section to compensate for a sharpness level of the image, based on the correlation calculated by the sharpness calculating section, so as to reduce a variation of the sharpness level before and after the image converting section converts the image in respect to the original image signals.

40 Claims, 17 Drawing Sheets

BLOCK DIAGRAM SHOWING SHARPNESS CORRECTING MEANS

EXAMPLE OF <INCREASED SIGNAL VALUE → DECREASED SHARPNESS>

[ INPUT VALUE ]

Input 1 : SH / Smax

Input 2 : SL / Smax

[ OUTPUT VALUE ]

Output : $\alpha$ / $\alpha$ max

[ INPUT VALUE ]

Input 1 : S(0) / Smax

Input 2 : S(M) / Smax

Input 3 : | S(0) - S(1) | / Smax

Input 4 : | S(1) - S(2) | / Smax

Input 5 : | S(0) - S(2) | / Smax

[ OUTPUT VALUE ]

Output1 : SH

Output2 : SL

[ INPUT VALUE ]

Input 1 : S(0) / Smax

Input 2 : S(M) / Smax

Input 3 : | S(0) - S(1) | / Smax

Input 4 : | S(1) - S(2) | / Smax

Input 5 : | S(0) - S(2) | / Smax

[ OUTPUT VALUE ]

Output : $\alpha$ / $\alpha$ max

FUNCTIONAL EVALUATION RESULT FROM VISUAL OBSERVATION OF MAMMOGRAPHY

|  | NUMBER OF MASKS | MICRO-CALCIFICATION RESOLUTION |
|---|---|---|
| PRIOR ART | — | × |
| EMBODIMENT EXAMPLE 1 | 2 | △ |
| EMBODIMENT EXAMPLE 2 | 3 | ○ |
| EMBODIMENT EXAMPLE 3 | 4 | ◎ |
| EMBODIMENT EXAMPLE 4 | 5 | ◎ |

FIG. 13 (a)
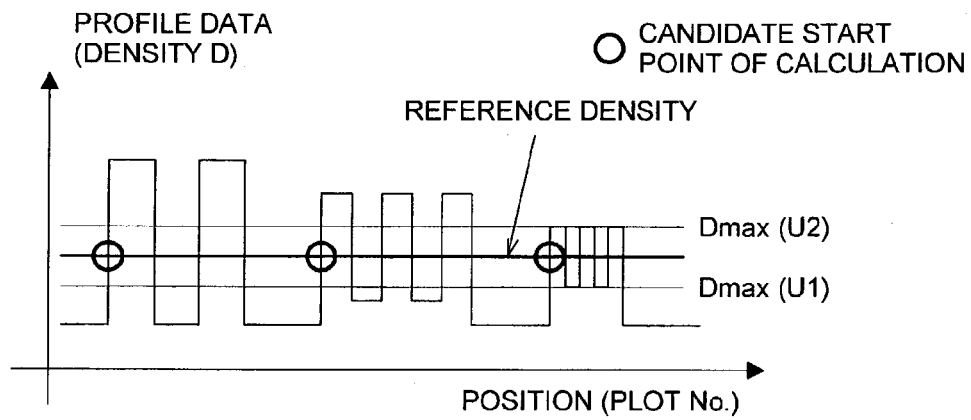
FIG. 13 (b)
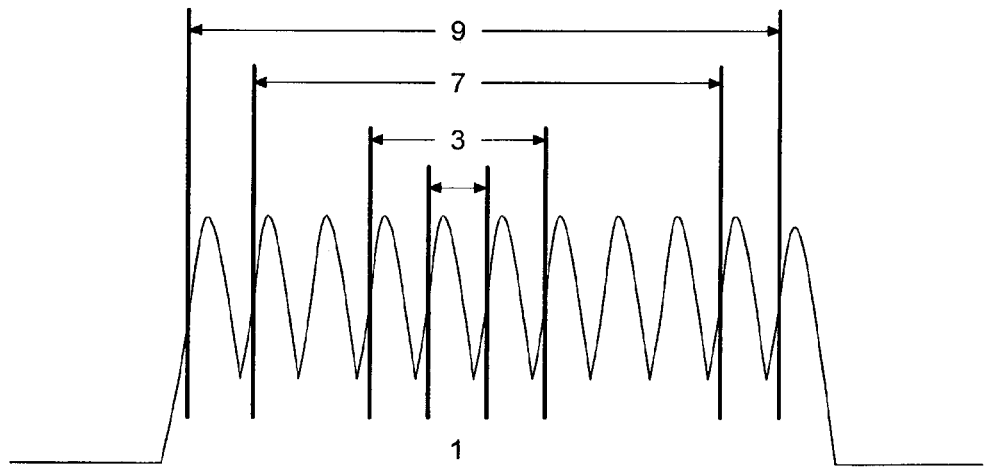
FIG. 14
FIGURE SHOWING A 2 × 2 SIMPLE MEAN FILTER
| 1/4 | 1/4 |
|---|---|
| 1/4 | 1/4 |

TABLE SHOWING THE RELATIONSHIP BETWEEN DISTRIBUTION
IN 8-CYCLE COUNT REPEATED PROCESSING WITH SIMPLE
MEAN FILTER AND GAUSSIAN DISTRIBUTION

Binomial × 8

| 1 | 8 | 28 | 56 | 72 | 56 | 28 | 8 | 1 |
|---|---|---|---|---|---|---|---|---|
| 1.3 | 7.6 | 26.6 | 56.2 | 72.2 | 56.2 | 26.6 | 7.6 | 1.3 |

GAUSSIAN DISTRIBUTION WHEN $\sigma^2=2$

FIGURE SHOWING AN EXAMPLE OF MASK

| 1/16 | 1/8 | 1/16 |
|---|---|---|
| 1/8 | 1/4 | 1/8 |
| 1/16 | 1/8 | 1/16 |

CURVE ON CYCLE COUNT OF FILTERING
PROCESSING AND RESPONSE

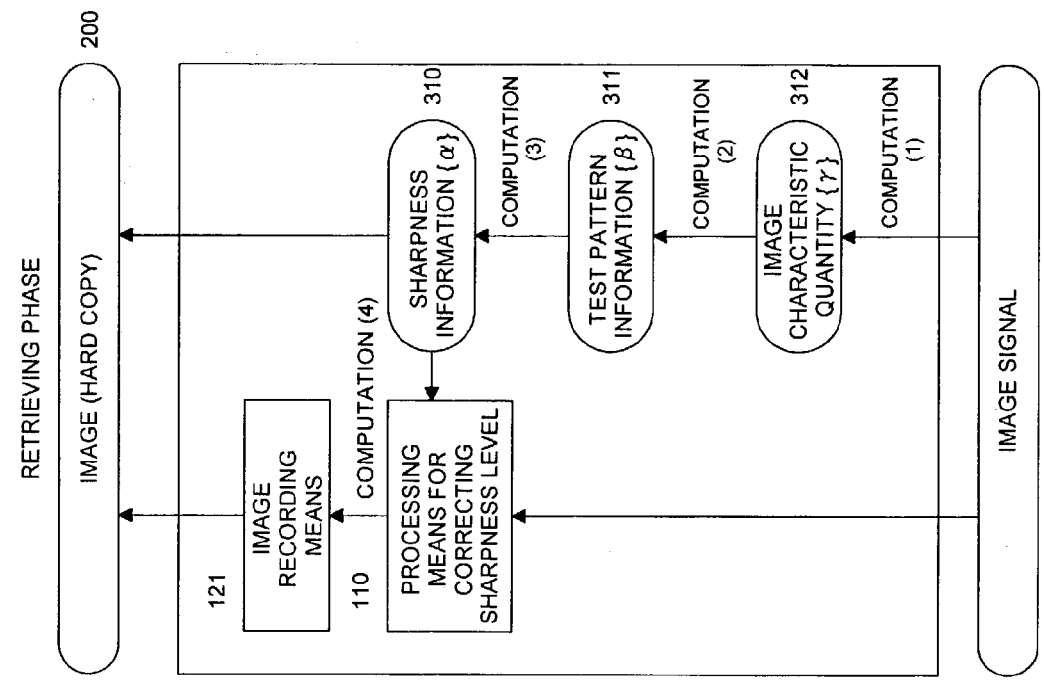
FIG. 18 (a) LEARNING PHASE
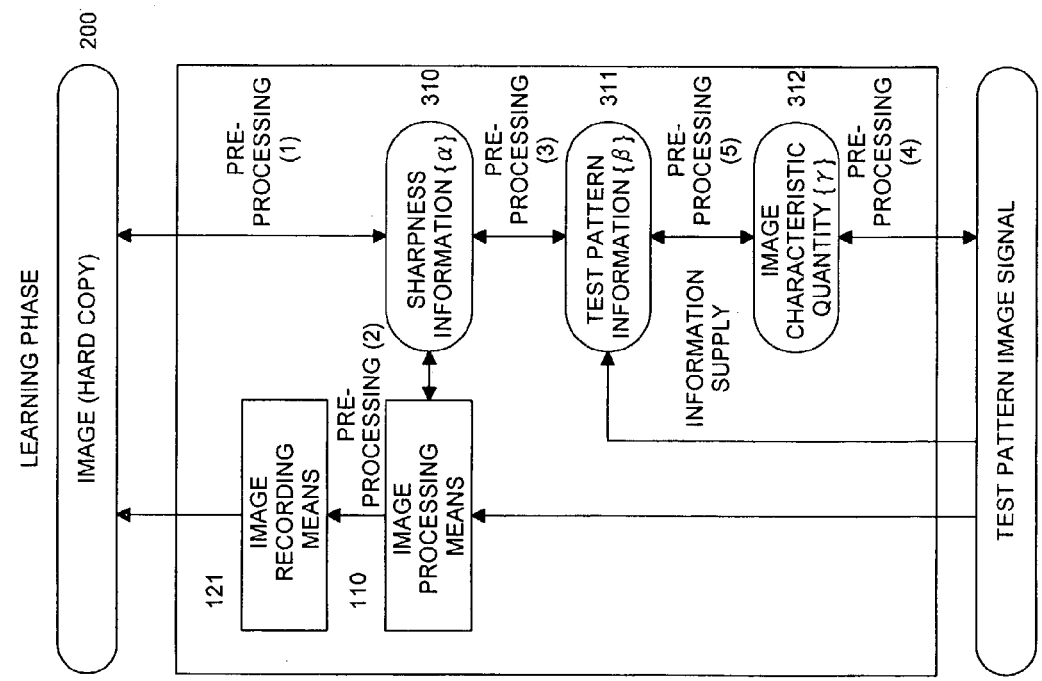
FIG. 18 (b) RETRIEVING PHASE

BLOCK DIAGRAM SHOWING AN EXAMPLE CONSTRUCTION OF DECOMPOSING SECTION THAT PERFORMS THE PYRAMID ALGORISM

↑ : INTERPOLATION PROCESSING

F : FILTERING PROCESSING

↓ : DOWN SAMPLING

BLOCK DIAGRAM SHOWING AN EXAMPLE CONSTRUCTION OF RECOVERY SECTION THAT PERFORMS THE PYRAMID ALGORISM

IMAGE PROCESSING METHOD AND IMAGE CONVERTING APPARATUS

BACKGROUND OF THE INVENTION

The present invention relates to an image processing for recording or displaying image on a recording medium based on the image information and, more exactly, relates to an image processing method and an image converting apparatus as well for performing the image processing for recording with ink-jet the medical image information obtained through an inputting device, such as medical photographing device.

These years, there have been invented methods of obtaining medical radiographic information without using a radiographic film made of silver-salt photosensitive material. For example, computed radiography (CR) has become popular; it is a device for reading radiographic image, in which a radiographic image, once stored on an imaging plate comprising mostly of stimulable phosphor, is taken out as an stimulable phosphor light, using an excitation light, and then the light is photoelectrically transferred into an image signal.

Of late, there has been proposed a device called flat panel detector (FPD) that reads out radiographic information using radiation phosphor or radiation photoconductive substance combined with a two-dimensional semiconductor detector such as a TFT switching device.

Besides, other radiographic image inputting devices better than simple radiographic device, for example, a X-ray computer tomographic unit (X-ray CT unit) and a magnetic resonance image generator (MRI generator) have also come into wider use. Most of these medical image inputting devices provide the image information in the form of digital signals.

A method most frequently employed for diagnosing these medical images is to record the image information on a transparent-type recording medium and/or a reflex-type recording medium and observe the image in the form of a hard copy. A recording type most frequently applied to a medical image recorder that records the medical image information on a recording medium is to record image on a transparent-type recording medium, made of silver-salt recording material, by laser exposure. With this recording type, monochrome multi-gradation image can be depicted with excellent gradient and besides, recording the image on a transmission medium and observing it with a transmission light enables to achieve high diagnostic resolution.

Besides, very recently, hopes are laid on a possibility of recording medical image using an ink-jet type recorder.

Though it is desirous for the above-mentioned medical image recorder to depict the image information obtained through a radiographic image inputting device as truly as possible, blurredness unique to each recorder is caused-to the image in practice.

For example, with a type that records image by laser exposure, some blurredness results from a fact that the laser beam has a certain size of diameter. With a so-called thermal recording type in which heat is added per every pixel to record image on a recording medium, blurredness results from a fact that the thermal head has a finite size or from the spread of heat. Even with an ink-jet recording type, blurredness results from various sizes of ink dots generated on a recording medium or from a fact that the coloring material of the ink blots and spreads into or on the recording medium. Besides, when using a display monitor such as CRT or liquid crystal display, blurredness of image is caused. The blurredness like the above is likely to result in poor diagnostic resolution and wrong diagnosis.

The above-mentioned blurredness of image differs in its level on different medical image recorders and, besides, even on the same medical image recorder, the level of blurredness may vary with the density of image to be recorded. Thus, diagnosis with stable image quality is prevented.

For a laser exposure recording type, for example, reducing the laser beam diameter will be useful to minimize the blurredness of image. This, however, results in a problem that very expensive optical system is needed or that the reduced beam diameter causes recording unevenness and hence the image quality is rather deteriorated. For an ink-jet recording type, reducing the emitted ink particle size will be useful to reduce the ink dot diameter. This, however, also results in a problem that reducing the ink particle size is technically very difficult and that the reduced ink particle size leads to lower recording speed.

Besides, when recording image by the ink-jet recording type, the ink adhesion onto a recording medium may vary with the image density to be recorded. The ease of movement of the color in the recording medium depends upon the ink adhesion onto the recording medium and therefore, the extent of spread of the ink, i.e. the sharpness characteristic varies. As a result, there arises a problem that the sharpness varies with the image density to be recorded and hence stable image quality cannot be attained.

In addition, it may be preferable, to some extent, for a commercial ink-jet printer or similar device that an image after excessive correction of the sharpness may have a different condition from that of the original image (for example, a condition where the sharpness is higher than in the original image). In an application of diagnosing medical image, however, this leads to an inconvenience.

SUMMARY OF THE INVENTION

To overcome the abovementioned drawbacks in conventional image-processing methods and image-converting apparatus, it is an object of the present invention to provide image-processing methods and image-converting apparatus, which makes it possible to produce images in stable quality, irrespective of density differences of the images to be recorded or differences in the conversion characteristics of various kinds of apparatus.

Further, it is a feature of the present invention that the frequency processing for correcting the sharpness level of image is performed, based on the image features or sharpness information, so that the variation between the sharpness levels before and after the image conversion step of the original image signal becomes smaller. Herein, "correcting the sharpness level of image so that the variation between the sharpness levels before and after the image conversion step of the original image signal" means that, when each of the sharpness level characteristic of the image information (image signal or image itself) obtained by directly executing the image conversion step for the original image signal and the sharpness level characteristic of the image (image signal or image itself) obtained by executing the image conversion step for the original image signal after performing the frequency processing beforehand is compared to the sharpness level characteristic peculiar to the original image signal, the latter, that is, the sharpness level characteristic of the image (image signal or image itself) subjected to the frequency processing is closer to that of the original image signal than the former. "Correcting the sharpness level"

means not only to increase the sharpness level that has decreased due to deterioration but also to return the sharpness level that has increased from the original condition to the original.

Accordingly, to overcome the cited shortcomings, the abovementioned object of the present invention can be attained by image-processing methods and apparatus described as follow.

(1) A method for processing original image signals of an image composed of a plurality of pixels, the method comprising the steps of: converting the image in respect to the original image signals; extracting image features for every pixel included in the plurality of pixels in respect to the original image signals; and performing a frequency processing operation for compensating for a sharpness level of the image, based on the image features extracted in the extracting step, so as to reduce a variation of the sharpness level before and after the converting step.

(2) The method of item 1, wherein the converting step is performed after applying an image interpolation processing to the original image signals; and wherein, when an interpolating-magnification factor of the image interpolation processing is equal to or greater than a predetermined value, the image interpolation processing is performed after performing the frequency processing operation, while, when the interpolating-magnification factor of the image interpolation processing is smaller than the predetermined value, the frequency processing operation is performed after performing the image interpolation processing.

(3) The method of item 1, wherein the image is a medical image.

(4) A method for processing original image signals of an image composed of a plurality of pixels, the method comprising the steps of: converting the image in respect to the original image signals; obtaining sharpness information from an image converting apparatus by which the converting step is performed; and performing a frequency processing operation for compensating for a sharpness level of the image, based on the sharpness information obtained in the obtaining step, so as to reduce a variation of the sharpness level before and after the converting step.

(5) The method of item 4, wherein the converting step is performed after applying an image interpolation processing to the original image signals; and wherein, when an interpolating-magnification factor of the image interpolation processing is equal to or greater than a predetermined value, the image interpolation processing is performed after performing the frequency processing operation, while, when the interpolating-magnification factor of the image interpolation processing is smaller than the predetermined value, the frequency processing operation is performed after performing the image interpolation processing.

(6) The method of item 4, wherein the image is a medical image.

(7) The method of item 4, wherein the sharpness information relate to at least one of SWTF, MTF and ARTF.

(8) A method for processing original image signals of an image composed of a plurality of pixels, the method comprising the steps of: converting the image in respect to the original image signals; extracting image features for every pixel included in the plurality of pixels in respect to the original image signals; obtaining sharpness information from an image converting apparatus by which the converting step is performed; calculating correlation between the image features and the sharpness information; and performing a frequency processing operation for compensating for a sharpness level of the image, based on the correlation calculated in the calculating step, so as to reduce a variation of the sharpness level before and after the converting step.

(9) The method of item 8, wherein the converting step is performed after applying an image interpolation processing to the original image signals; and wherein, when an interpolating-magnification factor of the image interpolation processing is equal to or greater than a predetermined value, the image interpolation processing is performed after performing the frequency processing operation, while, when the interpolating-magnification factor of the image interpolation processing is smaller than the predetermined value, the frequency processing operation is performed after performing the image interpolation processing.

(10) The method of item 8, wherein the image is a medical image.

(11) The method of item 8, wherein a neural network is employed for the calculating step.

(12) The method of item 8, wherein the frequency processing operation is performed, based on a formula of, $$Snew = \Sigma C_m S_m$$

where m=0, . . . , M. M: natural number,
  Snew: processed image signal;
  Sm: original image signal (when m=0) or unsharp image signal generated through a m-th unsharp masking processing (when m=1 to M),
  Cm: weight factor in the original image signal (when m=0) or weight factor in the m-th unsharpe image signal (when m=1 to M)).

(13) The method of item 12, wherein the weight factor is determined, based on the image features or the sharpness information.

(14) The method of item 12, wherein the weight factor is determined so as to keep $\Sigma C_m$ at a constant value.

(15) The method of item 12, wherein the frequency processing is applied to image signals generated from a mammographic image by employing at least three unsharp masks, modulation transfer functions of which are different each other.

(16) A method for processing an image composed of a plurality of pixels, the method comprising the steps of: applying an unsharp mask processing to original image signals of the image, composed of the plurality of pixels, to create a plurality of unsharp image signals; integrating at least two of first differential image signals between the original image signals and the plurality of unsharp image signals, second differential image signals between the unsharp image signals being different relative to each other, third differential image signals between the original image signals and image signals obtained by integrating the first differential image signals, fourth differential image signals between the original image signals and image signals obtained by integrating the second differential image signals, fifth differential image signals between lowest-frequency image signals for the original image signals and image signals obtained by integrating the first differential image signals, and sixth differential image signals between the lowest-frequency image signals for the original image signals and image signals obtained by integrating the second differential image signals, in order to generate a compensation signal; adding the compensation signal to the original image signals or the lowest-frequency image signals for the original image signals to generate processed image signals; and performing a frequency processing operation for compensating for a sharpness level of the image, by changing a modulation transfer function with respect to the unsharp mask processing, so as to reduce a variation of the sharpness level before and after a step of converting the image in respect to the original image signals.

(17) The method of item 16, wherein the converting step is performed after applying an image interpolation processing to the original image signals; and wherein, when an interpolating-magnification factor of the image interpolation processing is equal to or greater than a predetermined value, the image interpolation processing is performed after performing the frequency processing operation, while, when the interpolating-magnification factor of the image interpolation processing is smaller than the predetermined value, the frequency processing operation is performed after performing the image interpolation processing.

(18) The method of item 16, wherein the image is a medical image.

(19) The method of item 16, wherein the frequency processing is applied to image signals generated from a mammographic image by employing at least three unsharp masks, modulation transfer functions of which are different each other.

(20) The method of item 16, wherein the unsharp mask processing is repeated processing with a specific mask.

(21) The method of item 20, wherein the specific mask is a simple mean mask.

(22) The method of item 20, wherein the specific mask is a simple mean mask of 2-pixels by 2-pixels.

(23) The method of item 1, wherein the frequency processing operation for compensating for the sharpness level of the image is performed so that frequency characteristics before and after the converting step coincides each other in a predetermined frequency range.

(24) The method of item 23, wherein the predetermined frequency range is 0–3.0 cycle/mm.

(25) An apparatus for processing original image signals of an image composed of a plurality of pixels, the apparatus comprising: an image converting section to convert the image in respect to the original image signals; an image feature extracting section to extract image features for every pixel included in the plurality of pixels in respect to the original image signals; and a frequency processing section to compensate for a sharpness level of the image, based on the image features extracted by image feature extracting section, so as to reduce a variation of the sharpness level before and after the image converting section converts the image in respect to the original image signals.

(26) The apparatus of item 25, wherein the image converting section converts the image in respect to the original image signals after applying an image interpolation processing to the original image signals; and wherein, when an interpolating-magnification factor of the image interpolation processing is equal to or greater than a predetermined value, the image interpolation processing is performed after performing the frequency processing operation, while, when the interpolating-magnification factor of the image interpolation processing is smaller than the predetermined value, the frequency processing operation is performed after performing the image interpolation processing.

(27) The apparatus of item 25, wherein the image is a medical image.

(28) An apparatus for processing original image signals of an image composed of a plurality of pixels, the apparatus comprising: an image converting section to convert the image in respect to the original image signals; a sharpness information obtaining section to obtain sharpness information from the image converting section; and a frequency processing section to compensate for a sharpness level of the image, based on the sharpness information obtained by the sharpness information obtaining section, so as to reduce a variation of the sharpness level before and after the image converting section converts the image in respect to the original image signals.

(29) The apparatus of item 28, wherein the image converting section converts the image in respect to the original image signals after applying an image interpolation processing to the original image signals; and wherein, when an interpolating-magnification factor of the image interpolation processing is equal to or greater than a predetermined value, the image interpolation processing is performed after performing the frequency processing operation, while, when the interpolating-magnification factor of the image interpolation processing is smaller than the predetermined value, the frequency processing operation is performed after performing the image interpolation processing.

(30) The apparatus of item 28, wherein the image is a medical image.

(31) The apparatus of item 28, wherein the sharpness information relate to at least one of SWTF, MTF and ARTF.

(32) An apparatus for processing original image signals of an image composed of a plurality of pixels, the apparatus comprising: an image converting section to convert the image in respect to the original image signals; an image feature extracting section to extract image features for every pixel included in the plurality of pixels in respect to the original image signals; a sharpness information obtaining section to obtain sharpness information from the image converting section; a sharpness calculating section to calculate the correlation between the image features and the sharpness information; and a frequency processing section to compensate for a sharpness level of the image, based on the correlation calculated by the sharpness calculating section, so as to reduce a variation of the sharpness level before and after the image converting section converts the image in respect to the original image signals.

(33) The apparatus of item 32, wherein the image converting section converts the image in respect to the original image signals after applying an image interpolation processing to the original image signals; and wherein, when an interpolating-magnification factor of the image interpolation processing is equal to or greater than a predetermined value, the image interpolation processing is performed after performing the frequency processing operation, while, when the interpolating-magnification factor of the image interpolation processing is smaller than the predetermined value, the frequency processing operation is performed after performing the image interpolation processing.

(34) The apparatus of item 32, wherein the image is a medical image.

(35) The apparatus of item 32, wherein a neural network is employed for the sharpness calculating section.

(36) The apparatus of item 32, wherein the frequency processing section compensates for the sharpness level of the image, based on a formula of, Snew=ΣCmSm where m=0, . . . , M. M: natural number,
Snew: processed image signal;
Sm: original image signal (when m=0) or unsharp image signal generated through a m-th unsharp masking processing (when m=1 to M),
Cm: weight factor in the original image signal (when m=0) or weight factor in the m-th unsharpe image signal (when m=1 to M)).

(37) The apparatus of item 36, wherein the weight factor is determined, based on the image features or the sharpness information.

(38) The apparatus of item 36,
wherein the weight factor is determined so as to keep ΣCm at a constant value.

(39) The apparatus of item 36, wherein the frequency processing section applies frequency processing to image signals generated from a mammographic image by employing at least three unsharp masks, modulation transfer functions of which are different each other.

(40) A apparatus for processing an image composed of a plurality of pixels, the apparatus comprising: an image converting section to convert the image in respect to the original image signals; an unsharp mask processing section to apply an unsharp mask processing to original image signals of the image, composed of the plurality of pixels, to create a plurality of unsharp image signals; an integrating section to integrate at least two of first differential image signals between the original image signals and the plurality of unsharp image signals, second differential image signals between the unsharp image signals being different relative to each other, third differential image signals between the original image signals and image signals obtained by integrating the first differential image signals, fourth differential image signals between the original image signals and image signals obtained by integrating the second differential image signals, fifth differential image signals between lowest-frequency image signals for the original image signals and image signals obtained by integrating the first differential image signals, and sixth differential image signals between the lowest-frequency image signals for the original image signals and image signals obtained by integrating the second differential image signals, in order to generate a compensation signal; an adding section to add the compensation signal to the original image signals or the lowest-frequency image signals for the original image signals to generate processed image signals; and a frequency processing section to compensate for a sharpness level of the image, by changing a modulation transfer function with respect to the unsharp mask processing, so as to reduce a variation of the sharpness level before and after the image converting section converts the image in respect to the original image signals.

(41) The apparatus of item 40, wherein the image converting section converts the image in respect to the original image signals after applying an image interpolation processing to the original image signals; and wherein, when an interpolating-magnification factor of the image interpolation processing is equal to or greater than a predetermined value, the image interpolation processing is performed after performing the frequency processing operation, while, when the interpolating-magnification factor of the image interpolation processing is smaller than the predetermined value, the frequency processing operation is performed after performing the image interpolation processing.

(42) The apparatus of item 40, wherein the image is a medical image.

(43) The apparatus of item 40, wherein the frequency processing section applies frequency processing to image signals generated from a mammographic image by employing at least three unsharp masks, modulation transfer functions of which are different each other.

(44) The apparatus of item 40, wherein the unsharp mask processing is repeated processing with a specific mask.

(45) The apparatus of item 44, wherein the specific mask is a simple mean mask.

(46) The apparatus of item 44, wherein the specific mask is a simple mean mask of 2-pixels by 2-pixels.

(47) The apparatus of item 25, wherein the frequency processing section compensates for the sharpness level of the image, so that frequency characteristics, before and after the image converting section converts the image in respect to the original image signals, coincides each other in a predetermined frequency range.

(48) The apparatus of item 47, wherein the predetermined frequency range is 0–3.0 cycle/mm.

Further, to overcome the abovementioned problems, other image processing methods and apparatus, embodied in the present invention, will be described as follow:

(49) An image processing method characterized in that, in the image processing method including an image conversion step of the original image signal comprising multiple pixels, image feature is extracted from each of the multiple pixels of the original image signal, and frequency processing for correcting the sharpness level of the image is performed, based on the image feature, so that the variation between the sharpness levels before and after the image conversion step of the original image signal becomes smaller.

According to the present invention on an image processing method, when the image processing method that includes an image conversion step of the original image signal comprising multiple pixels is performed, image feature is extracted from each of the multiple pixels of the original image signal, and frequency processing for correcting the sharpness level of the image is performed, based on the image feature, so that the variation between the sharpness levels before and after the image conversion step of the original image signal becomes smaller.

That is to say, through the frequency processing for correcting the variation of sharpness level, not only the sharpness level that has decreased due to deterioration is increased but also the sharpness level that has increased from the original condition is returned to the original. As a result, images can be provided in stable quality irrespective of the difference in the density of image to be recorded or difference in the conversion characteristic of each device.

(50) An image processing method characterized in that, in the image processing method including an image conversion step of the original image signal comprising multiple pixels, sharpness information is obtained from an image converting apparatus that executes the image conversion step, and frequency processing for correcting the sharpness level of the image is performed, based on the sharpness information, so that the variation between the sharpness levels before and after the image conversion step of the original image signal becomes smaller.

According to the present invention on an image processing method, when the image processing method that includes an image conversion step of the original image signal comprising multiple pixels is performed, sharpness information is obtained from an image converting apparatus that executes the image conversion step, and frequency processing for correcting the sharpness level of the image is performed, based on the sharpness information, so that the variation between the sharpness levels before and after the image conversion step of the original image signal becomes smaller.

That is to say, through the frequency processing for correcting the variation of sharpness level, not only the sharpness level that has decreased due to deterioration is increased but also the sharpness level that has increased from the original condition is returned to the original. As a result, images can be provided in stable quality irrespective of the difference in the density of image to be recorded or difference in the conversion characteristic of each device.

(51) An image processing method characterized in that, in the image processing method including an image conversion step of the original image signal comprising multiple pixels, image feature is extracted from each of the multiple pixels of the original image signal, sharpness information is obtained from an image converting apparatus that executes the image conversion step, and a sharpness adaptive calculation for comparing the sharpness characteristic information with the sharpness information is performed, and then frequency processing for correcting the sharpness level of the image is performed, based on the result of the sharpness adaptive calculation, so that the variation between the sharpness levels before and after the image conversion step of the original image signal becomes smaller.

According to the present invention on an image processing method, when the image processing method that includes an image conversion step of the original image signal comprising multiple pixels is performed, image feature is extracted from each of the multiple pixels of the original image signal, sharpness information is obtained from an image converting apparatus that executes the image conversion step, and a sharpness adaptive calculation for comparing the sharpness characteristic information with the sharpness information is performed, and then frequency processing for correcting the sharpness level of the image is performed, based on the result of the sharpness adaptive calculation, so that the variation between the sharpness levels before and after the image conversion step of the original image signal becomes smaller.

That is to say, through the frequency processing for correcting the variation of sharpness level, not only the sharpness level that has decreased due to deterioration is increased but also the sharpness level that has increased from the original condition is returned to the original. As a result, images can be provided in stable quality irrespective of the difference in the density of image to be recorded or difference in the conversion characteristic of each device.

(52) The image processing method as described in item (50) or (51), characterized in that the sharpness information is sharpness information on any one of SWTF, MTF or ARTF.

According to the present invention on an image processing method, as the sharpness information described in item (50) or (51), sharpness information on any one of SWTF, MTF or ARTF of an image converted through the image conversion step of the image converting apparatus is used.

As a result of the above, the variation of sharpness level generated in the image conversion step of the image converting apparatus can be measured appropriately, and hence images can be provided in stable quality irrespective of the difference in the density of image to be recorded or difference in the conversion characteristic of each device.

(53) The image processing method as described in item (51), wherein the sharpness adaptive calculation is a computation utilizing a neural network.

According to the present invention on an image processing method, as the sharpness adaptive calculation described in item (51), a computation utilizing a neural network is employed. As a result, the sharpness characteristic information can be compared with the sharpness information under an appropriate condition through the neural network, and hence images can be provided in more stable quality irrespective of the difference in the density of image to be recorded or difference in the conversion characteristic of each device.

(54) The image processing method as described in any one of items (49) through (53), characterized in that the frequency processing for correcting the sharpness level of the image is performed, based on a formula $Snew = \Sigma C_m S_m$ (where $m=0, \ldots, M$; M: natural number; Snew: processed image signal; $S_m$: original image signal (when $m=0$) or unsharp image signal generated through the m-th unsharp masking processing (when $m=1$ to M); $C_m$: weight factor in the original image signal (when $m=0$) or weight factor in the m-th unsharpe image signal (when $m=1$ to M)), so that the variation between the sharpness levels before and after the image conversion step of the original image signal becomes smaller.

According to the present invention on an image processing method as described in items (49) through (53), as a result of employing so-called multi-resolution frequency processing in the frequency processing, images can be provided in more stable quality irrespective of the difference in the density of image to be recorded or difference in the conversion characteristic of each device.

(55) The image processing method as described in item (54), characterized in that the weight factor is determined based on the image feature or sharpness information.

As a result of determining the weight factor in item (54) based on the image feature or sharpness information, so-called multi-resolution frequency processing is performed, and hence images can be provided in more stable quality irrespective of the difference in the density of image to be recorded or difference in the conversion characteristic of each device.

(56) The present invention is an image processing method as described in item (54) or (55), characterized in that the weight factor is determined so that $\Sigma C_m$ becomes constant.

As a result of determining the weight factor in item (54) or (55) so that $\Sigma C_m$ becomes constant, so-called multi-resolution frequency processing is performed, and hence images can be provided in much more stable quality irrespective of the difference in the density of image to be recorded or difference in the conversion characteristic of each device.

(57) An image processing method characterized in that multiple unsharp image signals are generated through unsharp masking processing of the original image signal comprising multiple pixels; a correction signal is obtained by integrating two, at least, or more of the differential image signal between the original image signal and multiple unsharp image signals, differential image signal between different unsharp image signals, or differential image signal between the original image signal or lowest frequency image signal corresponding to the original image signal and the image signal obtained by integrating the above differential image signals; a processed image signal is obtained by adding the correction signal to the original image signal or the lowest frequency signal corresponding to the original image signal; and then frequency processing for correcting the sharpness level of the image is performed, while changing the modulation transfer function for the unsharp masking processing, so that the variation between the sharpness levels before and after the image conversion step of the original image signal becomes smaller.

With a construction as above, the frequency characteristic of the processed image signal can be adjusted more minutely by changing the frequency characteristic of the mask.

(58) The image processing method as described in any one of items (54) through (57), characterized in that the unsharp masking is repeated masking processing with a specific mask.

As a result of performing repeated masking with a specific mask in the unsharp masking processing for generating the unsharp image signal as described in items (6) through (9), so-called multi-resolution frequency processing is performed based on multiple band pass signals, and hence images can be provided in more stable quality irrespective of the difference in the density of image to be recorded or difference in the conversion characteristic of each device.

(59) The image processing method as described in item (58), characterized in that the mask is a simple mean mask.

As a result of performing repeated processing with a specific filter of a simple mean mask in the unsharp masking processing for generating the unsharp image signal as described in item (58), so-called multi-resolution frequency processing is performed based on multiple band pass signals, and hence images can be provided in more stable quality irrespective of the difference in the density of image to be recorded or difference in the conversion characteristic of each device.

(60) The present invention is an image processing method as described in item (58) or (59), wherein the mask is a simple mean mask of 2-pixels by 2-pixels.

As a result of performing repeated processing with a specific filter of a simple mean mask of 2-pixels by 2-pixels in the unsharp masking processing for generating the unsharp image signal as described in item (58) or (59), so-called multi-resolution frequency processing is performed based on multiple band pass signals, and hence images can be provided in more stable quality irrespective of the difference in the density of image to be recorded or difference in the conversion characteristic of each device.

(61) The image processing method as described in any one of items (49) through (60), characterized in that frequency processing for correcting the sharpness level of the image is performed, based on the result of the sharpness adaptive calculation, in a specified frequency band so that the frequency characteristics before and after the image conversion step of the original image signal become approximately equal.

According to the present invention on an image processing method as described in items (49) through (60), frequency processing for correcting the sharpness level of the image is performed in a specified frequency band so that the frequency characteristics before and after the image conversion step become approximately equal.

As a result of the above, within a frequency band specified as desired, images can be provided in stable quality irrespective of the difference in the density of image to be recorded or difference in the conversion characteristic of each device.

(62) The image processing method as described in item (61), characterized in that the specified frequency band is 0 to 3.0 cycle/mm.

As a result of performing the frequency processing in a specified frequency band of 0 to 3.0 cycle/mm, images can be provided in stable quality irrespective of the difference in the density of image to be recorded or difference in the conversion characteristic of each device.

(63) The present invention is an image processing method as described in any one of items (54) through (62), wherein the number of unsharp masks is three, at least, or more and the frequency processing is performed on the image signal generated from a mammographic image.

As a result that the number of unsharp masks is three, at least, or more and the frequency processing is performed on the image signal generated from a mammographic image, medical images for mammography can be provided in more stable quality irrespective of the difference in the density of image to be recorded or difference in the conversion characteristic of each device.

(64) The image processing method as described in any one of items (49) through (63), characterized in that, when the image conversion step is executed after image interpolation processing of the original image signal, the image interpolation processing is performed after the frequency processing if the image interpolation processing at an image-interpolating magnification factor equal to or greater than a specified value, but the frequency processing is performed after the image interpolation processing if the image interpolation processing at an image-interpolating magnification factor less than a specified value.

According to the present invention on an image processing method as described in items (49) through (63), the image interpolation processing is performed after the frequency processing if the image interpolation processing at an image-interpolating magnification factor equal to or greater than a specified value, but the frequency processing is performed after the image interpolation processing if the image interpolation processing at an image-interpolating magnification factor less than a specified value.

As a result of altering the turn of the image interpolation processing and the frequency processing according to the image-interpolating magnification factor, deterioration of image decreases and images can be provided in more stable quality irrespective of the difference in the density of image to be recorded or difference in the conversion characteristic of each device.

(65) The image processing method as described in any one of items (49) through (64), characterized in that the frequency processing is performed on the original image signal generated from a medical image.

As a result of performing the image processing as described in items (49) through (64), medical images can be provided in more stable quality irrespective of the difference in the density of image to be recorded or difference in the conversion characteristic of each device.

(66) An image converting apparatus characterized in that, the image converting apparatus is provided with an image processing means for performing image processing by an image processing method as described in any one of items (49) through (65).

According to the present invention on an image converting apparatus, through the frequency processing for correcting the variation of sharpness level, not only the sharpness level that has decreased due to deterioration is increased but also the sharpness level that has increased from the original condition is returned to the original.

As a result, in processing images, images can be provided in stable quality irrespective of the difference in the conversion characteristic of each image processor.

(67) An image converting apparatus characterized in that, the image converting apparatus is provided with an image processing means for performing image processing by an image processing method as described in any one of items (49) through (65) and an image displaying means for displaying the image signal on which the image processing has been performed by the image processing means.

According to the present invention on an image converting apparatus, through the frequency processing for correcting the variation of sharpness level, not only the sharpness level that has decreased due to deterioration is increased but also the sharpness level that has increased from the original condition is returned to the original.

As a result, in displaying images, images can be provided in stable quality irrespective of the difference in the conversion characteristic of each image display.

(68) An image converting apparatus characterized in that, the image converting apparatus is provided with an image processing means for performing image processing by an image processing method as described in any one of items (49) through (65) and an image recording means for recording on a recording medium the image signal on which the image processing has been performed by the image processing means.

According to the present invention on an image converting apparatus, through the frequency processing for correcting the variation of sharpness level, not only the sharpness level that has decreased due to deterioration is increased but also the sharpness level that has increased from the original condition is returned to the original.

As a result, in recording images, images can be provided in stable quality irrespective of the difference in the density of image to be recorded or the difference in the conversion characteristic of each image recorder.

(69) The image converting apparatus as described in any one of items (66) to (68), characterized in that the image converting apparatus is provided with a sharpness information inputting means for inputting the sharpness information into this image converting apparatus.

According to the present invention on an image converting apparatus, as a result of having a sharpness information inputting means that inputs the sharpness information, suitable sharpness information can be inputted and images can be provided in stable quality.

(70) The image converting apparatus as described in any one of items (66) to (69), characterized in that the image processing means performs the image processing on the original image signal generated from a medical image.

Through the image processing on medical images as described in items (66) to (69), images can be provided in more stable quality irrespective of the difference in the density of image to be recorded or difference in the conversion characteristic of each device.

BRIEF DESCRIPTION OF THE DRAWINGS

Other objects and advantages of the present invention will become apparent upon reading the following detailed description and upon reference to the drawings in which:

FIG. 13(a) and FIG. 13(b) are explanatory figures on an embodiment example of the present invention;

FIG. 14 is an explanatory figure on an embodiment example of the present invention;

FIG. 18 is an explanatory figure on an embodiment example of the present invention;

DETAILED DESCRIPTION OF THE PREFERRED EMBODIMENT

Figure 1:
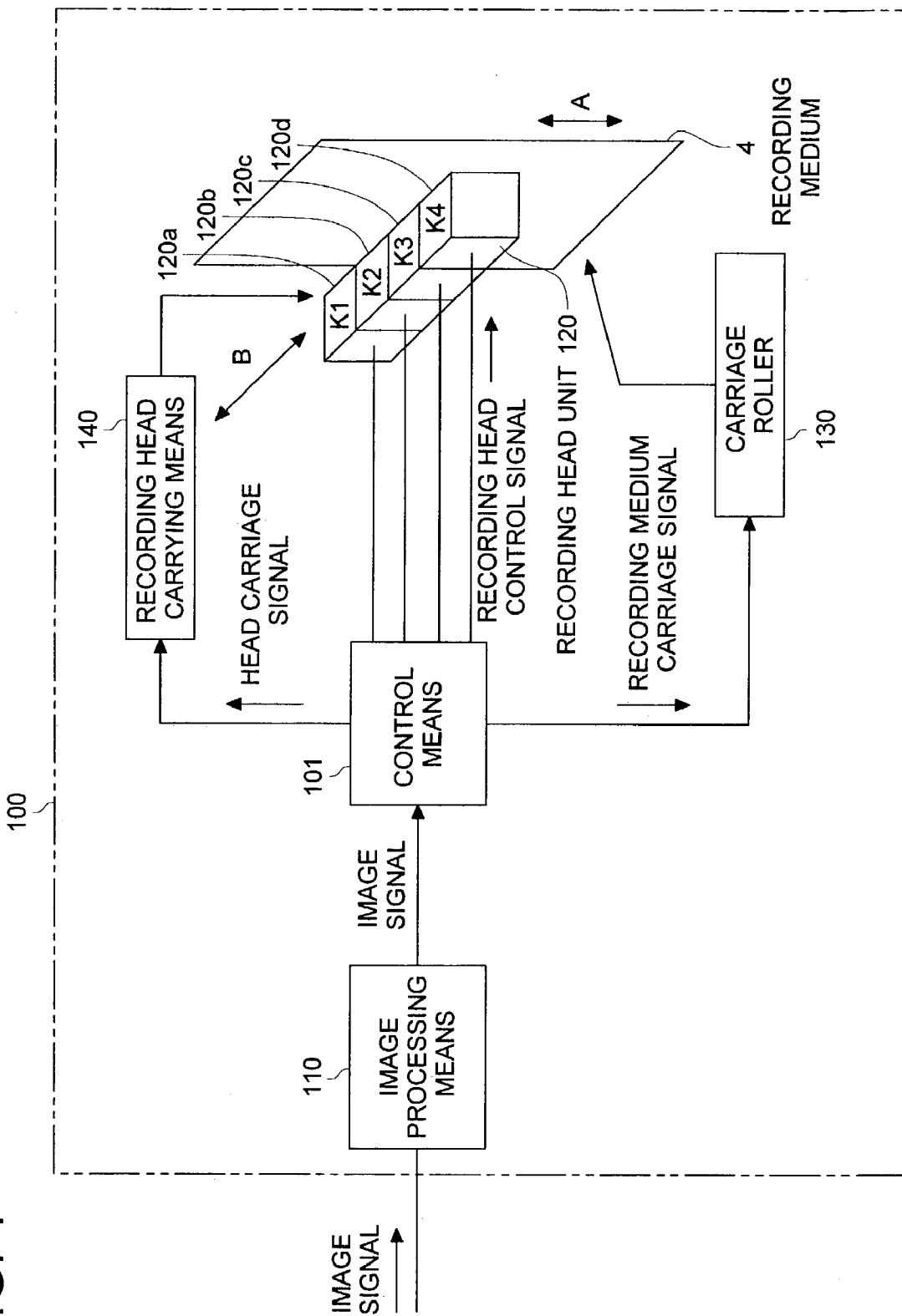
FIG. 1 is a block diagram showing a brief electrical construction of an image recorder according to an embodiment example of the present invention.

Referring to the drawings, a preferred embodiment of the present invention is explained hereunder. The present invention, however, is not limited to the concrete examples of the embodiment described hereunder.

<Definition of Image Converting Apparatus>

An "image conversion step" in this embodiment means any one of the following:

(1) a step for outputting an image based on an image signal (wherein outputting means recording or displaying), (2) a step for performing image processing based on the original image signal, or (3) a step for photographing a subject and converting the shape characteristic of the image into an image.

Hereunder, an object that is converted through the image conversion step is called an "input object", and an object that is obtained as a result of the conversion through the image conversion step is called an "output object".

In case (1) above, the input object is image signal and the output object is hard copy. In case (2) above, the input object is image signal and the output object is image signal. In case (3) above, the input object is subject (object) and the output object is image signal.

The image conversion step of the present embodiment is applicable to any one of the image inputting, image processing, image displaying and image recording steps provided that either input object or output object is image signal. Because the mode of the input/output objects is different in each case, different sharpness information may be used in each image converting apparatus.

<Overall Structure of Image Recorder>

Description hereunder is made, using a concrete example of image recorder as an example of a device for performing the image processing method of the present invention and also as an example of a device to which the image converting apparatus of the present invention applies.

FIG. 1 is a block diagram showing the function block relating to the image recording by the image recorder. The image recorder 100 of the present embodiment has a recording head unit 120 as a recording means for recording images by ink emission.

A control means 101 controls each portion of the image recorder 100 of the present embodiment. Besides, the control means 101 also takes charge of control over the frequency processing for correcting the variation of sharpness level of the recorded image caused by the image recorder, recording medium or ink used for recording, of which control is one of the characteristics of the present embodiment.

110 is an image processing means, to which an image signal is inputted from an external medical photographing device or storage device, and performs necessary image processing. The processing means also performs frequency processing for correcting the sharpness level of the recorded image caused by the image recorder, recording medium or ink used for recording, of which image processing is one of the characteristics of the present embodiment. Herein, "correcting the sharpness level" means not only to increase the sharpness level that has decreased due to deterioration but also to return the sharpness level that has increased from the original condition to the original.

Besides, an image signal input from an external device may be sent via a network of various types. The image signal processed by the image processing means 110 is sent to the image control means 101.

The recording head unit 120 is equipped with four recording heads 120a to 120d in series for black ink K1 to K4 of different density, respectively, and a recording head control signal is supplied from the control means 101 to each of them. These recording heads 120a to 120d may be integrated or installed separately. Generating an image using four different types of ink as above enables to obtain higher quality and better multi-gradation as an image used for medical diagnosis or reference. To generate an image for medical use that is required to have multi-gradation, it is preferable to use three to four kinds of ink of different density. In order to eliminate string-like irregularity peculiar to the image recorder, emitting the ink evenly from the recording head onto the recording surface is necessary, and as a result, thicker ink receiving layer is needed as the ink absorption increases. If the ink receiving layer is made thicker, scratches are apt to be caused on the recording surface, and hence more careful handling of the recording medium is required.

The ink emission mechanism of the ink-jet head may be an ink-jet type that utilizes the piezo electric effect or utilizes a bubble forming force generated at the time when the ink is heated momentarily. The number of nozzle holes suitable for an ink-jet type for medical application is about 64 to 512. The traveling speed of ink particles is preferably 2 to 20 m/s and the amount of ink particles per emitted drop is preferable 1 to 50 pico litter.

130 is a carriage roller that carries the recording medium in the main scan direction. 140 is a recording head carriage means that carries the recording head in the sub scan direction. Herein, the carriage roller 130 carries the recording medium 4 in the arrow A direction based on the recording medium carriage signal. The head unit carriage means 140 is installed to allow the recording head unit 120 to move in the direction B perpendicular to the carriage direction of the recording medium 4.

The recording head carriage means 140 moves the recording head unit 120 in the arrow B direction according to the head carriage signal. Each of the recording heads 120a to 120d generates an image on the recording medium 4 based on the recording head control signal. To the control means 101, an image signal is sent from the image processing means 110, and to the image processing means 110, an image signal is inputted from an external photographing device or storage device. Input to the image processing means may be sent via a network.

<Overall Construction of Sharpness Correction by Image Recorder>

Figure 2:
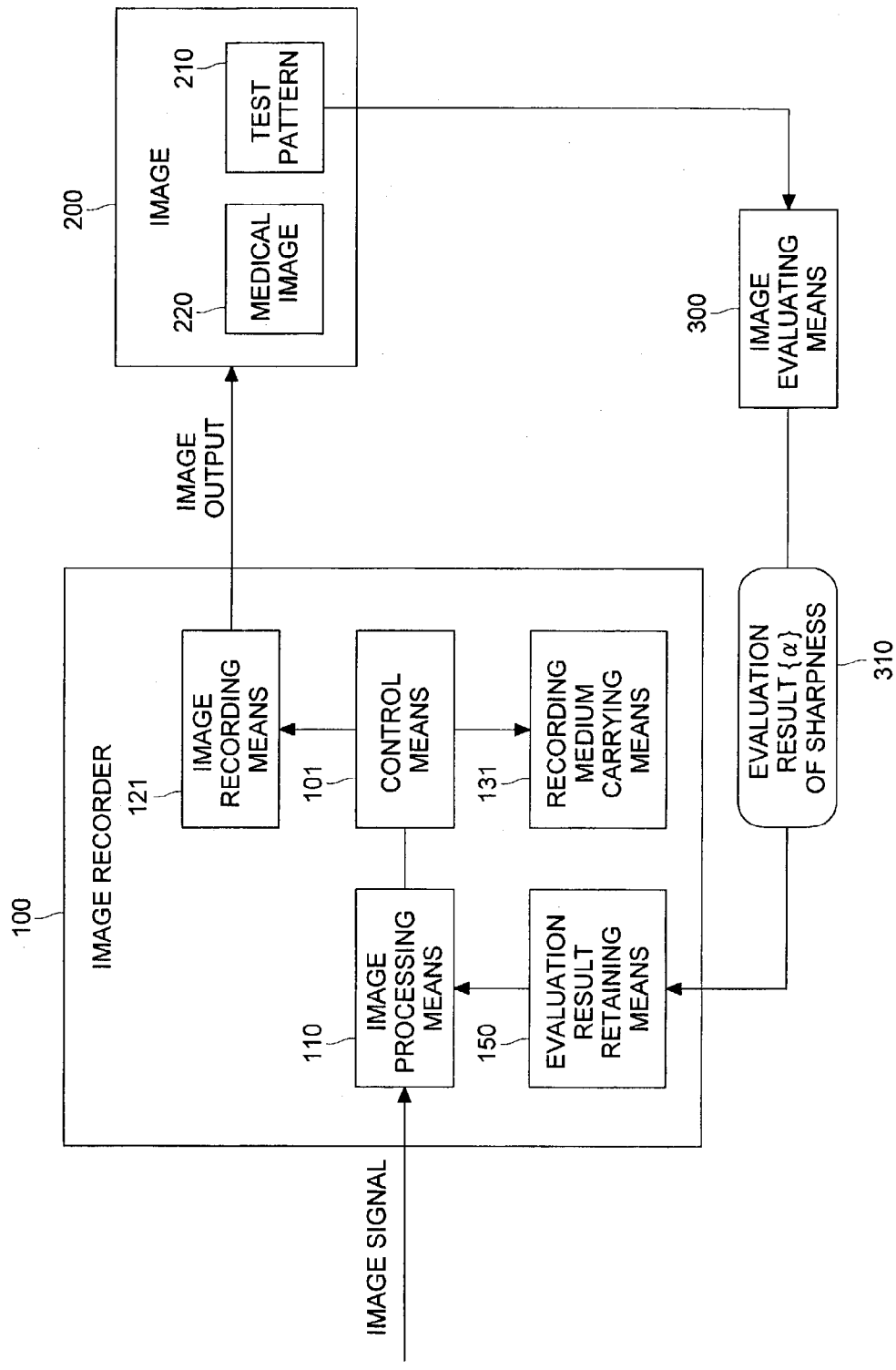
FIG. 2 is a block diagram showing a characterized portion of an image recorder according to an embodiment example of the present invention.

FIG. 2 is a block diagram showing the function block relating to the image recording accompanied by sharpness correction by the image recorder.

The image recorder 100 of the present embodiment has an image recording means 121, comprising a recording head unit 120 (See FIG. 1) that records images by ink emission.

A control means 101 not only controls each portion of the image recorder 100 of the present embodiment but also takes charge of control over the frequency processing for correcting the variation of sharpness level of the recorded image caused by the image recorder, recording medium or ink used for recording, of which control is one of the characteristics of the present embodiment.

110 is an image processing means, to which an image signal is inputted from an external medical photographing device or storage device, and performs necessary image processing (frequency processing for correcting the variation of sharpness level). The processing means also frequency processing for correcting the sharpness level of the recorded image caused by the image recorder, recording medium or ink used for recording, of which image processing is one of the characteristics of the present embodiment. Herein, "correcting the sharpness level" means not only to increase the sharpness level that has decreased due to deterioration but also to return the sharpness level that has increased from the original condition to the original. Besides, an image signal input from an external device may be sent via a network of various types. The image signal processed by the image processing means 110 is sent to the image control means 101.

The image recording means 121, which records images in various recording ways, is constructed as shown in FIG. 1 in case of ink-jet type recording. 131 is a recording medium carrying means including a carriage roller for carrying the recording medium 4.

150 is an evaluation result retaining means into which the "result of sharpness evaluation", to be described later, is inputted and retained. The evaluation result is referred to in the frequency processing by the image processing means 110.

200 is an image outputted from the image recorder 100, and a test pattern 210 or medical image 220 is the one.

300 is an image evaluating means that evaluates the variation of sharpness level of the test pattern 210. 310 is the "sharpness evaluation result $\{\alpha\}$", that is, evaluation result from the image evaluating means 300. The sharpness evaluation result $\{\alpha\}$ is retained in the evaluation result retaining means 150. The above-mentioned evaluation result of the sharpness correction means the sharpness information mentioned in each claim.

If the image recorder 100 is so designed that the sharpness information such as a result of the sharpness evaluation is inputted by a sharpness information inputting means and the learning phase is completed automatically based on the sharpness information, it becomes possible to perform desired sharpness level correction as soon as any image signal is transferred to the image recorder. The sharpness information inputting means can be of various types, including pushbutton, dip switch, entry keyboard, and touch panel on a display, but not limited thereto, and any type is applicable provided that it allows smooth input of the sharpness information. For example, it can be one mounted on an operation panel, including an LED display, installed on an ink-jet type image recorder, or it can be an externally connected display such as CRT display, LC display or organic EL display. It is preferable to integrate the image displaying means and sharpness information inputting means because set-up for inputting the sharpness information becomes easier.

<Explanation on Recording Medium

A characteristic of the recording medium described in the present embodiment is that, in practice, a monochrome image is depicted on it with liquid ink. It is preferable that the medium is a sheet with an area of practically 15×10 cm or more, four corners being cut round, made of colorless or blue resin with a thickness of 75 to 250 µm at least, having at least one void-type ink absorption layer on one side.

If the thickness is less than 75 µm, the medium is hard to handle because of sagging down of the sheet. If the thickness is more than 250 µm, on the contrary, fairly heavy weight is disadvantageous in bringing a pile of the sheets.

Since the conventional X-ray film is a transparent sheet without color or with blue color, it is preferable that the recording medium for the present embodiment is a transparent sheet made of colorless or blue color resin, in order to prevent the users from having a sense of incongruity.

Further, the recording medium described in the present embodiment is preferably of a type that at least one void-type ink absorption layer is provided on at least one side and the other side with no ink absorption layer has a matted layer so as to assure the mechanical carriage performance of printer or to prevent multiple sheets of film, when piled up, from sticking to each other.

The recording medium described in the present embodiment can be produced by increasing the percentage of voids of the ink absorption layer as much as possible and subjecting the surface to mat treatment to generate unevenness.

Besides, white metallic oxide such as titanium oxide or lead oxide can be added to the ink absorption layer or a layer under it.

It is also possible to form a layer on one side of the backing opposite to the other side having the ink absorption layer and disperse the metallic oxide such as titanium oxide or lead oxide over the layer, or to provide the ink absorption layer on both sides of the backing.

Materials applicable to transparent backing, serving as the recording mediums described in the present embodiment, are polyester type such as polyethylene-terephthalate (PET), cellulose ester type such as nitro cellulose and cellulose acetate, and besides, polysulfone, polyimide, and polycarbonate. The sheet recording medium shall preferably be colored blue. This blue color is added to prevent the eye from being dazzled by excessive transmitted light through non-image portion as explained above, and also to produce an effect of allowing a black image to appear favorably. Accordingly, since at least one side of the sheet backing is provided with an ink absorption layer, the backing of the recording medium must be subjected to corona discharge treatment, flame treatment or ultraviolet ray irradiation treatment to enhance the adhesion of the ink absorption layer.

The ink absorption layer shall preferably be a layer of three-dimensional mesh structure having the percentage of voids of 40% to 90%. It is preferable that the three-dimensional mesh structure is made of silica particles or organic particles, having an average particle size of 20 nm or less, and water-soluble resin, and the mass ratio of the silica particles or organic particles to the water-soluble resin is within a range of 1.2:1 to 12.1.

When the above is met, the pores that form the voids of the three-dimensional mesh structure has an average diameter of 5 to 40 nm and the pores forming the voids has the pore capacity of 0.3 to 1 ml/g.

It is preferable that silica particles are of silicic acid, having two to three silarol groups per surface area 1 $nm^2$, and that the three-dimensional mesh structure is made of chains that are formed by the coupling of secondary particles, having a size of 10 to 100 nm, of the aggregated silica particles.

Applicable particles include, for example, colloidal silica, potassium silicate, zeolite, kaolinite, halloysite, muscovite, talc, calcium carbonate, calcium sulfate, and aluminum oxide.

Water-soluble resin shall preferably be polyvinyl alcohol, but gelatin or one disclosed in the Japanese Application Patent Laid-open Publication No. HEI 7-276789 (1995) is also applicable.

The ink absorption layer shall preferably have the specific surface area of 50 to 500 $m^2/g$. Besides, to prevent sheets, when piled up, from sticking to each other, it is preferable to disperse mat particles having an average particle size of 5 to 100 µm on the surface.

It is acceptable to add surface active agent as antistatic agent.

The surface with no ink absorption layer can be coated with gelatin or water-soluble resin to prevent curling. It is also acceptable that this layer is subjected to antistatic treatment, mat treatment for preventing sticking, and coloring blue, and also coated with metallic oxide particles such as titanium oxide particles and lead oxide particles.

At the time of transmission radiograph observation, a number of films are frequently treated. In order to ensure smooth recognition of the surface and rear of an image at a glance, it is preferable to provide a notch, for example, on the upright corner of each sheet so that the surface and rear of the sheet can easily be recognized.

<Description on Ink>

In the present embodiment, it is possible to generate an image by emitting multiple inks of different tone, using the ink-jet heads that are a means for emitting multiple inks separately and independently. Besides, it is also possible to generate an image by emitting multiple monochromatic inks of different density, using the ink-jet heads that are a means for emitting multiple inks separately and independently.

In other words, when these inks are used independently or in combination as monochromic ink in multiple grades of density, for example, two grades, three grades or four grades, different ink-jet head can be employed for each ink density. For example, K1, K2, K3 and K4 inks are applicable for generating a monochromatic image. For generating a color image, each ink-jet head is needed for each ink, for example, yellow (Y), magenta (M), cyan (C), and black (B).

For the coloring material that solves or disperses into ink water, any one of pigment, water-soluble dye and dispersing dye is applicable.

Applicable pigment is any known organic or inorganic pigment. For example, inorganic pigment includes azo pigment such as azolake, insoluble azo pigment, condensed azo pigment, and chelate azo pigment, polycyclic pigment such as phthalocyanine pigment, perylene and perylene pigment, anthraxquinone pigment, quinaklydone pigment, dioxanezene pigment, thioindigo pigment, isoindolinone pigment, and quinophthaloni pigment, dye lake such as basic dye type lake and acid dye type lake, and nitro pigment, nitroso pigment, aniline black, and daylight fluorescent pigment, and organic pigment includes carbon black.

Applicable equipment for dispersing the pigment includes ball mill, sand mill, At lighter, roll mill, agitator, Henschell mixer, colloid mill, ultrasonic homogenizer, purl mill, wet jet mill, and paint shaker. While dispersing the pigment, dispersing agent can also be added. Applicable dispersing agent includes anion type or nonion type surface active agent, and polymer dispersing agent.

The ink used in the present embodiment can be prepared as black ink by selecting suitable pigments or using a single kind of known dye or dyes in combination.

Applicable water-soluble dye includes, for example, acid dye, basic dye, and reactive dye.

Applicable black dye includes, for example, CI (color index) Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, and 199.

The ink used in the present embodiment can be prepared as black ink by selecting suitable pigments or using a single kind of known dye or dyes in combination.

For example, water-soluble black ink that is liquid in normal temperature is prepared when carbon black is used as pigment and ethylene glycol material and surface active agent or antiseptic agent are mixed.

In case of using dye, water-soluble black ink that is liquid in normal temperature is prepared when Direct Black 19, Direct Black 159, Surfer Black 1, Acid Black 2, or CI Food Black 2 is mixed into a solution containing ethylene glycol, glycerin, surface active agent, and antiseptic agent. An appropriate amount of Direct Black 19 (blue ink) is mixed to adjust the tone.

In generating an image, it is preferable to employ a combination of inks with different density and tone, using the inks prepared as above, vary the finely in harmony with the variation of density of the image, and cover as wide density range as possible.

When inks of different tone are employed, Acid Blue 9, Acid Red 52 or 94, Acid Yellow 23, Direct Yellow 86 or 142 is used as coloring material. Besides, for example, use of an ink disclosed in the Japanese Application Patent Laid-open Publication No. 2000-129182 is also preferable in this embodiment.

Applicable water-soluble organic solvent includes alcohol group (for example, alcohols (for example, methanol, ethanol, isopropanol, butanol, isbbutanol, secondarybutanol, tertiarybutanol, pentanol, hexanol, cyclohexanol, and benzyl alcohol), polyatomic alcohol group (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol) polyatomic alcohol ether group (for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), amine group (for example, ethanol amine, diethanol amine, triethanol amine, N-methyl diethanol amine, N-ethyl diethanol amine, morpholine, N-ethyl morpholine, ethylene diamine, diethylene diamine, triethylene tetramine, tetraethylene pentamine, polyethylene imine, pentamethyl diethylene triamine, and tetramethyl propylene diamine), amide group (for example, form amide, N,N-dimethyl form amido, N,N-dimethyl acetoamide), hetrocyclic group (for example, 2-pyrolidone, N-methyl-2-pyrolidone, cyclohexyl pyrolidone, 2-oxazolidone, and 1,3-dimethyl-2-imida zolidinone), sulfoxid group (for example, dimethyl sulfoxid), sulfone group (for example, sulfolane), urea, acetonitril, and acetone.

Surface active agent may be added to ink, as needed. Favorable surface active agent for ink includes anionic surface active agent such as dialkyl-sulfo succinic acid, alkyl naphthalene sulfonate, and fat acid salt, nonionic surface active agent such as polyoxy-ethylene alkyl ether, polyoxiethylene allyl ether, acetylene glycol, and polyoxy-propylene block copolymer, and cationic surface active agent such as alkyl amine salt and Class-4 ammonium salt.

In addition to the above, other materials such as mildew preventing agent, pH conditioning agent, and viscosity conditioning agent can be added to the ink, as needed.

<Operation of Image Recorder>

The image recorder of the present embodiment has an image processing means 110 (See FIG. 1) for correcting the variation of sharpness level because of the image recorder. So-called frequency processing is applicable to the image processing in the image processing means 110. It is preferable that the characteristic of the inputted image signal is approximately equal to that of the recorded image as a result of the correction through the frequency processing, because the frequency characteristic of the inputted image data can be reproduced precisely.

It is a characteristic of the present embodiment that image feature is extracted from each pixel of the original image signal, sharpness information is obtained from an image converting apparatus that executes the image conversion step, and a sharpness adaptive calculation for comparing the sharpness characteristic information with the sharpness information is performed, and that frequency processing for correcting the variation of sharpness level, caused in the image conversion step of the original image, is performed based on the result of the sharpness adaptive calculation.

That is to say, through the frequency processing for correcting the variation of sharpness level, not only the sharpness level that has decreased due to deterioration is increased but also the sharpness level that has increased from the original condition is returned to the original. As a result, images can be provided in stable quality irrespective of the difference in the density of image to be recorded or difference in the conversion characteristic of each device.

It is a characteristic of the present embodiment that the above-mentioned sharpness information is sharpness information on any one of SWTF, MTF or ARTF of an image converted through the image conversion step of the image converting apparatus.

What are SWTF (rectangular wave response function) and MTF (modulation transfer function) is explained hereunder.

The test pattern image in FIG. 3(b), which is a test patter image for sharpness evaluation, is generated from the signal in FIG. 3(a). The sharpness evaluation herein means obtaining the SWTF or MTF. In other words, the sharpness evaluation means obtaining the variation of sharpness level caused in the image conversion step of the original signal.

The sharpness evaluation test pattern image (FIG. 3(b)) comprises a normalized portion having the lowest spatial frequency and a non-normalized portion having other spatial frequencies. In the normalized portion or non-normalized portion of the sharpness evaluation test patter image, there is formed a mass of bars arranged at a specified interval along the main scan direction (write direction) of the recorder. Hereinafter, a mass of the bars is called a chart element, and a mass of the chart elements is called a chart.

SWTF, which is synonymous with rectangular wave response function, is generally calculated in the following steps. When an image data corresponding to a rectangular wave chart is generated, to start with, and an image is recorded in the recorder based on the image data, a rectangular wave chart image is obtained. In a rectangular wave chart image with N-number of chart elements, for example, if the chart elements are numbered in ascending order of spatial frequency, i=1 means normalized spatial frequency and i=2 to N means non-normalized spatial frequency. Average part of the peak in the profile of the i-th chart element (i=1 to N) and find the density DHi at the high level and the density DLi at the low level. Then, using the two values, obtain the contrast Ci=(DHi−DLi)/(DHi+DLi) that represents the response of the recorder. Because the frequency is extremely low in the normalized portion, it shall be adjusted so as not to cause deterioration of the image sharpness. SWTF is now obtained as the contrast ratio SWTF(ui)=Ci/C1 by dividing the contrast of the non-normalized portion by the contrast of the normalized portion. Here, ui means the spatial frequency of the i-th chart element.

MTF, modulation transfer frequency, is equivalent to the spatial frequency characteristic of a sine wave response.

How to calculate MTF using a rectangular wave chart is explained below. Draw a smooth approximation curve SWTF(u) based on N-number of plots of SWTF(ui) obtained by the above calculation, and convert it into MTF(u) using the Coltmann's formula. This formula is described in detail, for example, in "Radiographic Image Information Technology (I)" (written by Uchida, Kanamori, and Inatsu; issued by the Japan Radiation Technology Association) pages 167–172.

In reality, however, the test pattern in FIG. 3(b) is read out by the image evaluation means 300 and a signal as shown in FIG. 3(c) is obtained. By referring to the highest SH and lowest SL of the signal, the MTF characteristic is obtained as shown in FIG. 3(d). Then, necessary correction level is calculated as shown in FIG. 3(e) so that the MTF characteristic becomes flat.

When calculating the MTF characteristic as above using a rectangular wave chart, in order to make the sharpness levels before and after the correction strictly identical, it is necessary to perform such frequency processing that acts upon the modulation transfer function where $MTF^{-1}(u)=1/MTF(u)$ holds true. Frequency processing applicable to this includes a blurred masking processing or a method where an image signal is subjected to Fourier transformation, filtering processing in the frequency space, and then inverse Fourier transformation. So-called blurred masking (unsharp masking) processing is explained hereunder.

The sharpness level can be controlled through frequency processing, where a blurred masking processing represented by the following expression is employed. This control is disclosed in the Japanese Application Patent Laid-Open Publication Nos. Sho 55-163472, SHO 62-62373, and SHO 62-62376.

$$Sproc = Sorg + \beta \times (Sorg - Sus) \quad (1)$$

where

Sproc: signal with exaggerated frequency, Sorg: original image signal, Sus: Blurred image signal, and β: exaggeration factor.

As image processing method has advanced these days, it becomes possible to achieve more sharp processing effect by a multi-resolution method. Multi-resolution method is a way of obtaining a processed image signal, where an original image signal is decomposed into multiple image signals by frequency band and then a whole image is recovered after specified image processing is performed. Image processing using the multi-resolution method is introduced in "Digital Image Processing" (by Springer-Verlag, 1991). For example, the Japanese Application Patent Laid-Open Publication No. Hei 10-75395 discloses preferred image processing, using:

$$Sproc = Sorg + \beta(Sorg) \cdot Fusm(Sorg, Sus1, Sus2, \ldots SusN)$$

$$Fusm(Sorg, Sus1, Sus2, \ldots SusN)$$

$$= \{f1(Sorg - Sus1) + f2(Sus1 - Sus2) + \ldots +$$

$$fk(Susk - 1 - Susk) + \ldots + fN(SusN - 1 - SusN)\}$$

where

Sproc: signal with exaggerated high frequency component,

Sorg: original image signal,

Susk(k=1 to N): unsharp masking image signal, fk(k=1 to N): factor for converting the each limited-band image signal, and β(Sorg): exaggeration factor that is determined based on the original image signal The frequency processing methods as explained above are applicable to the processing for correcting the sharpness level.

Figure 4:
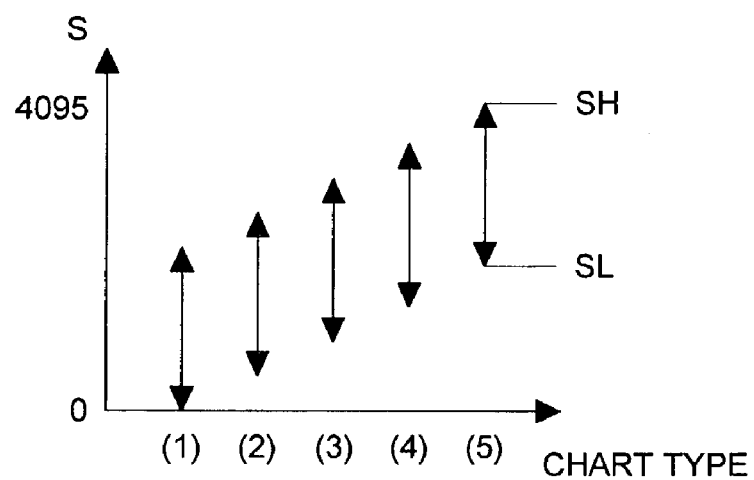
FIG. 4(a) and FIG. 4(b) are explanatory figures showing a correction process in an embodiment example of the present invention.
Figure 4:
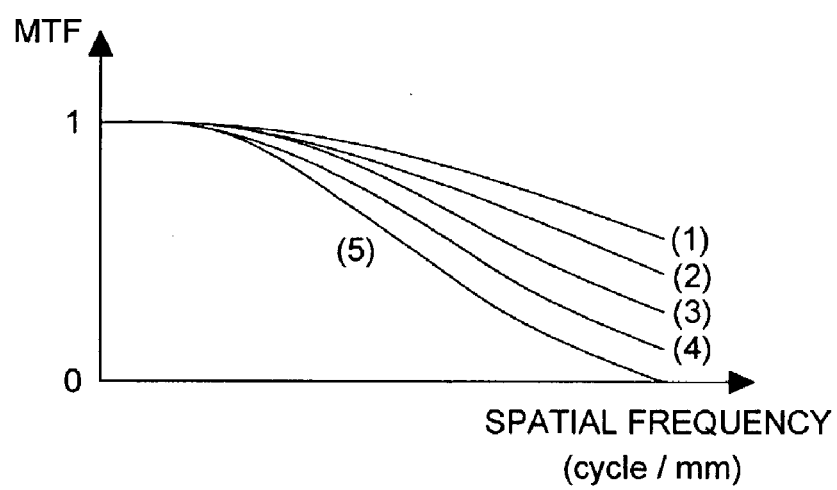

FIG. 4(a) and FIG. 4(b) show an example of the MTF characteristic in an ink-jet type image recorder. When employing, for example, an image forming method where increased density is achieved by increasing the total volume of the emitted ink particles, the sharpness level decreases in the periphery of a structure with high output density because the ink emission density becomes higher and hence ink spread can be caused easily.

Figure 3:
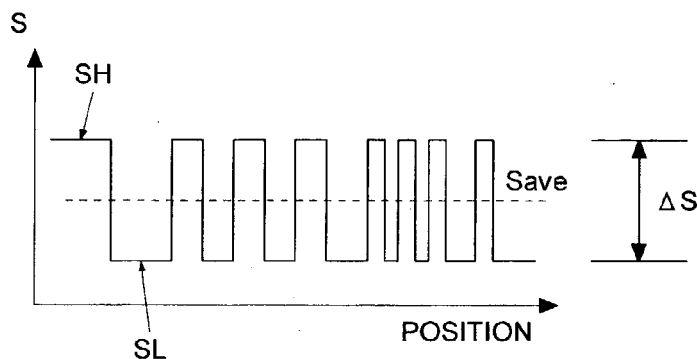
FIG. 3(a), FIG. 3(b), FIG. 3(c), FIG. 3(d) and FIG. 3(e) are explanatory figures showing a correction process in an embodiment example of the present invention.
Figure 3:
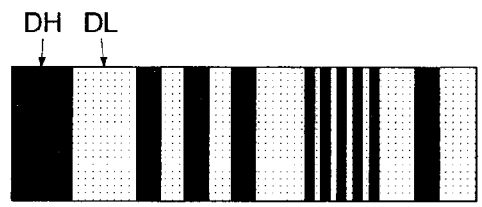
Figure 3:
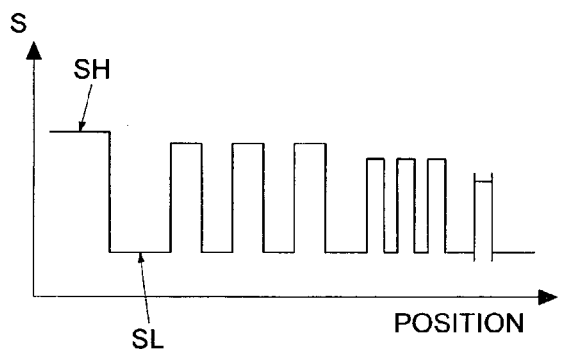
Figure 3:
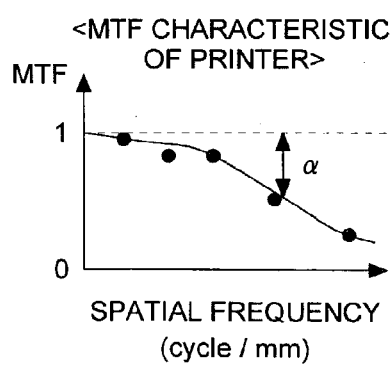
Figure 3:
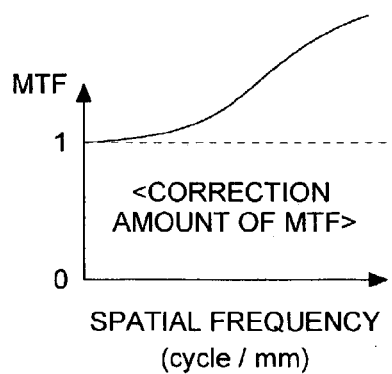

When it is relatively apparent that the sharpness level tends to vary as above, correction by a conventional method as disclosed, for example, in FIG. 3 of the Japanese Application Patent Laid-Open Publication No. Sho 55-163472 will be sufficient. If, however, the sharpness level varies depending upon the combination of density, the above method can hardly correct the sharpness level in some cases.

Figure 5:
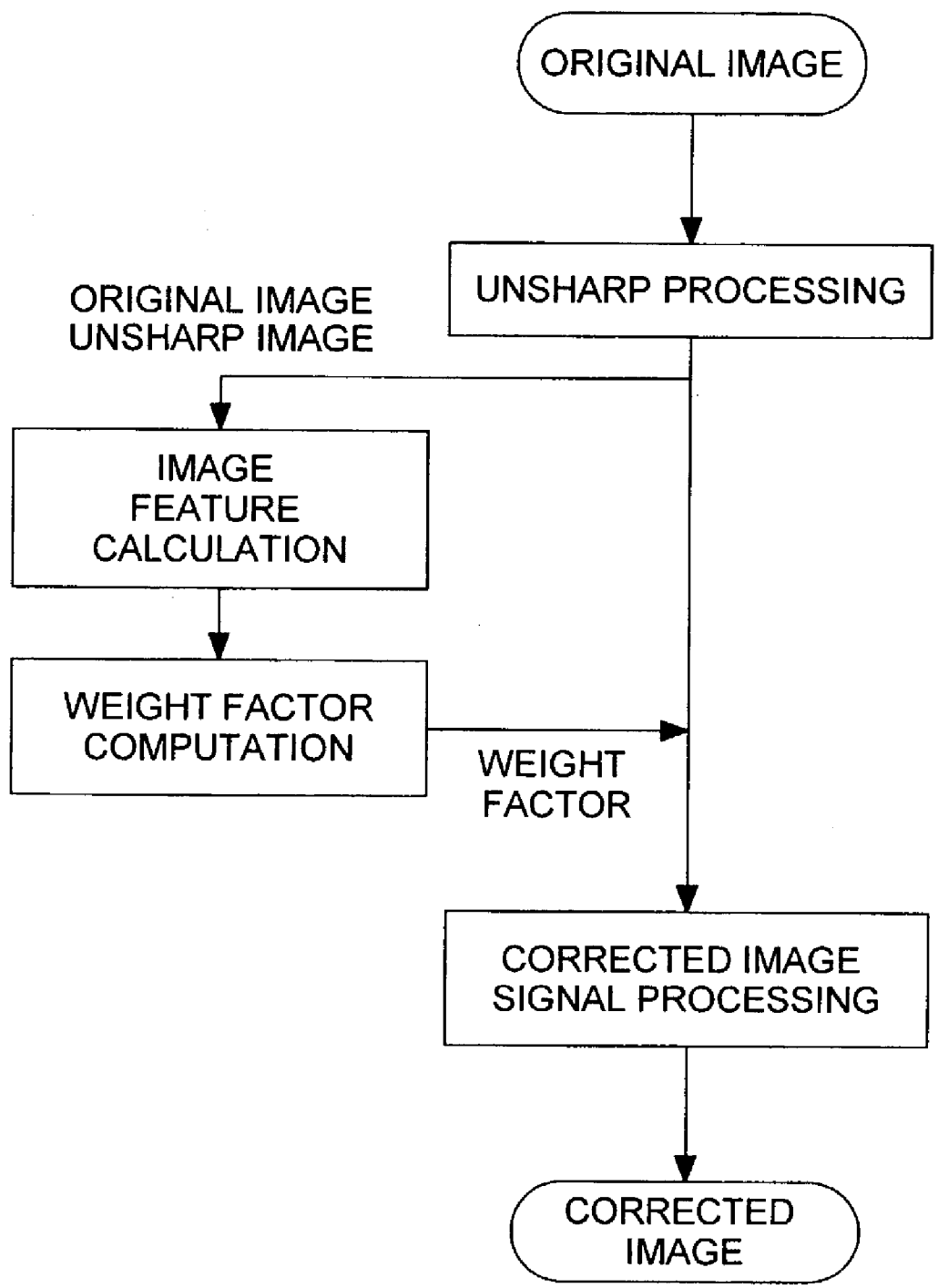
FIG. 5 is an explanatory figure showing a correction process in an embodiment example of the present invention.
Figure 6A:
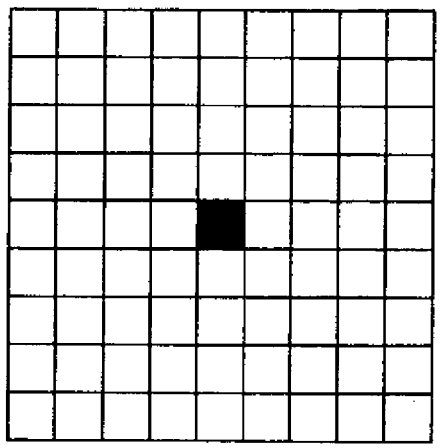
FIG. 6(a), FIG. 6(b), FIG. 6(c) and FIG. 6(d) are explanatory figures on an embodiment example of the present invention.
Figure 6B:
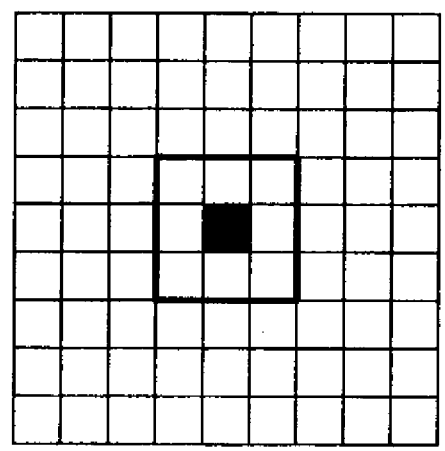
Figure 6C:
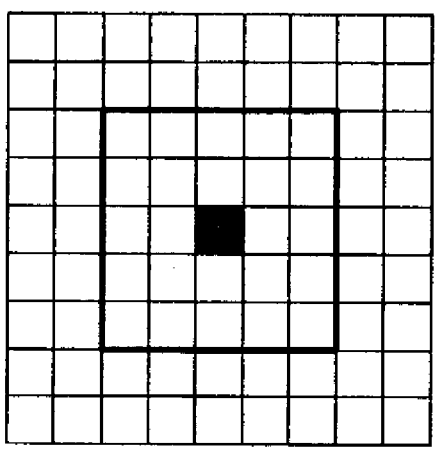
Figure 6D:
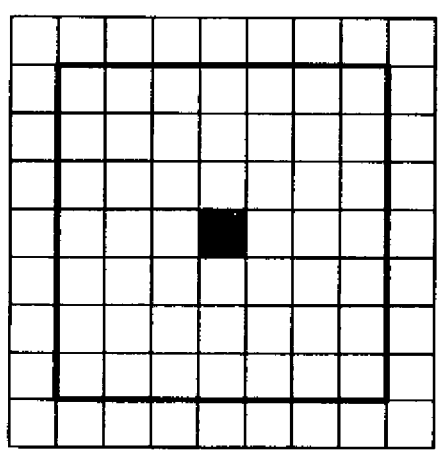

FIG. 5 is a flowchart typically showing a brief correction process in the present embodiment. According to this embodiment, a test pattern 210 is outputted beforehand from the image recorder 100, and then the test pattern 210 is evaluated by the image evaluating means 300 and the sharpness information (evaluation result of the correction of the sharpness level) is obtained. Then, by comparing the test pattern 210 with the image structure, the most appropriate correction of the sharpness level is performed.

Here, the "image structure" means, as a whole, qualitative or quantitative image characteristic of each pixel. For example, the qualitative characteristic includes characteristics that can be detected visually, such as a portion, shape and contour; and the quantitative characteristic includes characteristics that are expressed in quantity, such as an image signal value of a specific pixel and mean signal value of peripheral pixels.

That is to say, in the present embodiment, correction of the sharpness is processed according to the flowchart in FIG. 5. In the chart, a corrected image is obtained as a result that the unsharp processing computation is executed (FIG. 5S1), the image feature of each pixel of the original image signal is extracted (FIG. 5S2), a weight factor for the image feature is calculated (FIG. 5S3), and a computation for obtaining a corrected image signal is executed using the weight factor (FIG. 5S5).

OTHER EMBODIMENT

In the above-mentioned embodiment, description is made using a concrete example of image recorder as an example of the image converting apparatus. The image converting apparatus of the present embodiment is applicable to any one of the image processing, image displaying and image recording steps. Because the mode of the output object is different in each case, different sharpness information may be used in each image converting apparatus.

It is preferable to use a medical image, particularly a medical image of mammography as the image to be processed, because images can be provided in stable quality irrespective of the difference in the density of image to be recorded or difference in the conversion characteristic of each device.

Although the description in each embodiment as above uses an ink-jet recording type as the recording means, the present invention is not limited to use of the ink-jet recording type but any other recording types, including wet or dry silver-salt laser recording type and thermal transfer recording type, and any impact recording type such as wire dot recording type, are applicable. In addition, there is no need to limit the present invention to use of a serial recording type but so-called line recording type is also applicable.

In addition, the image display to which the present invention can apply may be any one of CRT display, transmission or reflection type liquid crystal display, organic EL display, plasma display, and the like, without any limitation to the display type.

In addition, the type of the image inputting device (photographing device) includes radiographic unit such as CR and FPD, X-ray computer tomographic unit (X-ray CT unit), magnetic resonance image generator (MRI generator), ultrasonic image diagnostic unit, electronic endoscopes, and retinal camera, but not limited thereto.

The present invention is very much efficient particularly in the field of medical images that contain monochrome multi-gradation image signals and require to be of extremely high quality, because the effect of improved sharpness level is produced remarkably.

Besides, any embodiment, wherein software program code for realizing the functions of the above-mentioned embodiments is supplied to a computer in an apparatus or system connected with each of the above-mentioned devices so as to operate the devices so that the functions of the embodiments are realized and then, the devices are operated in accordance with a programs stored in the computer (CPU or MPU) of the system or apparatus, is included in the scope of the present invention.

Further, since the program code itself of the above software realizes the functions of the embodiments in the above case, the program code itself and also a means for supplying the program code into a computer including, for example, a storage medium in which the program code has been stored constitute the present invention. Applicable storage medium includes, for example, flexible disk, hard disk, optical disk, opto-magnetic disk, CD-ROM, magnetic tape, non-volatile memory card, and ROM.

Needless to say, not only in case that the functions of the above-mentioned embodiments are realized as the computer executes the supplied program code but also in case that the functions are realized as the computer executes the program code in collaboration with an OS (operating system) or other application software operating on the computer, those program codes are included in the embodiment of the present invention.

Furthermore, when the supplied program code is once stored in the memory installed on a function expansion board of a computer or on an expanded capability unit connected to a computer, and then a CPU or the like mounted on the function expansion board or expanded capability unit performs part or whole of actual processing in accordance with the instructions of the program code and the functions of the above-mentioned embodiments are realized as a result of the processing, the program code is, needless to say, included in the scope of the present invention.

Example of Embodiment

A concrete example of the embodiment of an image processing method that includes an image conversion step of the original image signal comprising multiple pixels, wherein image feature is extracted from each of the multiple pixels of the original image signal, and the sharpness level of the image is corrected, based on the image feature or sharpness information, so that the variation between the sharpness levels before and after the image conversion step of the original image signal becomes smaller, is explained hereunder, particularly using an image recorder as an example.

If the sharpness information of the image recorder can be known in advance, it is possible to correct the sharpness level based on the sharpness information. If the sharpness characteristic of a test pattern like a rectangular wave chart is obtained in advance and suitable correction amount of the sharpness level is understood, it becomes possible to perform the most suitable sharpness level correction onto, at least, a rectangular wave test pattern.

The image to be recorded, however, is not always a test pattern like the rectangular wave chart, and appropriate sharpness level correction must be performed for any type of image signal.

It, therefore, is necessary to extract the image feature from an image to be subjected to the sharpness level correction, check up the image structure in the periphery of each pixel with the image feature, and perform appropriate sharpness correction based on the sharpness characteristic analogized from the check-up.

The present embodiment can be briefly separated into two phases: a learning phase as pre-processing (See FIG. 18(*a*)) and a retrieving phase as actual sharpness correction (See FIG. 18(*b*)). Description below is given separately on the learning phase and on the retrieving phase.

The pre-processing (learning phase) requires each of the pre-processing (1): sharpness evaluation of test pattern and definition of sharpness information, pre-processing (2): determination of weight factor suitable for the sharpness level correction, pre-processing (3): sharpness adaptive calculation (comparison of the sharpness information with the test pattern information), pre-processing (4): extraction of the image feature, and pre-processing (5): image structure check-up computation based on the image characteristic. Processing methods of the above are explained hereunder in sequence. FIG. 18(*a*) shows the outline of the processing in this learning phase.

<Pre-Processing (1): Sharpness Evaluation of Test Pattern and Definition of Sharpness Information>

To start with, it is necessary to perform the sharpness evaluation of the test pattern and define clearly the sharpness information corresponding to the evaluation result. "Sharpness information" means information either on the "sharpness level" that represents the level of sharpness of an image or on the "sharpness" that represents the characteristic. The former can be a physical evaluation value itself such as MTF and SWTF, and a factor used for approximating the sharpness level characteristic (MTF characteristic curve) with a specified function type or a characteristic parameter related to the factor are also applicable. The latter can be a quantified value of a functional evaluation result from visual observation of an image, wherein functional evaluation method and quantification method do not matter.

An example for obtaining the sharpness information based on the MTF sharpness level of a rectangular wave test pattern is explained hereunder.

FIG. 18 shows a process for obtaining the sharpness information $\{\alpha\}$ 310 through the pre-processing (1).

Of the image signal representing the rectangular wave chart, the higher signal value is denoted SH and the lower signal value is denoted SL (See FIG. 3(*a*)). The rectangular wave chart is recorded on a recording medium based on the image signal (See FIG. 3(*b*)), a density profile representing the rectangular wave chart is found using a micro-densitometer (See FIG. 3(*c*)), and then the sharpness MTF(up) is obtained as a result of mathematical computation and analysis of the density profile (See FIG. 3(*d*)). Herein, "up" is the spatial frequency of the rectangular wave chart and, if the rectangular wave chart comprises P-number of different spatial frequencies, p=1 to P applies. Then, MTF(u) is obtained in an approximating manner based on the analysis result (up, MTF(up)). Applicable approximation function can be of various types, including exponential polynomial, Gauss function, Lorentz function, and the like, but not limited thereto. For example, an expression MTF($\alpha$, u)=2/(1+exp($\alpha$|u|)) is also applicable.

Herein, $\alpha$ represents the sharpness information that is not only a parameter showing the extent of variation of the sharpness but also a parameter showing the extent of correction of the sharpness as described later (See FIG. 3(*d*)).

As MTF(0, u)=1 applies if $\alpha$=1 and MTF($\infty$, u)=0 applies if $\alpha$=$\infty$ in the above expression, the sharpness turns to be better when $\alpha$ is smaller and worse when $\alpha$ is greater, and hence the frequency characteristic can be expressed suitably and easily.

While, for simplification's sake, only one piece of sharpness information ($\alpha$) is used for one rectangular wave chart in the present embodiment, it is not necessary to use only a piece of sharpness information for a rectangular wave chart but multiple pieces of information will do. Hereinafter, on an assumption that multiple pieces of the sharpness information may be available, the sharpness information $\alpha$ is expressed as $\{\alpha\}$ in a generalized style.

Besides, it is recommended to prepare a combination {SHk, SLk} of k-number of pieces each of the image signals SH and SL representing the rectangular wave chart and find $\{\alpha k\}$ corresponding to them. Herein, SHk, SLk, and $\{\alpha k\}$ mean the higher signal value in the k-th rectangular wave chart, lower signal value of the same, and sharpness information corresponding to the k-th rectangular wave chart, respectively, and k=1 to K holds true if k-number of rectangular wave charts are available. In order to improve the sharpness level correction accuracy, k is preferred to be sufficiently great. That is, it is preferable to prepare as many rectangular wave charts as possible and find their sharpness information in advance.

Besides, the sharpness information $\{\alpha\}$ can be an index value itself such as MTF, SWTF or ARTF obtained through physical evaluation, or, when approximating the spatial frequency characteristic using a specified function type, a parameter specific to the function type may be applied. Various ways can be thought out, including, for example, a case where the MTF characteristic is regarded as a Gauss function, in which its value is 1 at the zero frequency and MTF attenuates as the spatial frequency increases, and the standard deviation obtained through the least square or the like is regarded the sharpness information $\{\alpha\}$. Naturally, the approximation expression for MTF may be a polynomial or Lorentz function, and the type of the function does not matter provided that the MTF characteristic can be approximated precisely. Different methods other than the above can be applied also to the sharpness adaptive calculation.

<Pre-Processing (2): Determination of Weight Factor Suitable for Sharpness Level Correction>

Next, a weight factor suitable for the sharpness correction is determined. The "weight factor" means a weight factor in the original image signal and unsharp image signal, and the processed image signal is exhibited as a linear sum of the original image signal and unsharp image signal. When the weight factor in the m-th unsharp image signal is denoted Cm, it is preferable that $\Sigma$Cm is constant in order to maintain the gradation balance of the whole image after the image processing and that $\Sigma$Cm=1 always holds true in order to maintain the gradation characteristic before and after the image processing.

With an image recorder having such sharpness level characteristic of which sharpness information is equal to the above-mentioned $\alpha$, in order to precisely recover the sharpness, taking the above characteristic into account, it is sufficient to perform a frequency processing equivalent to $MTF^{-1}(\alpha, u)=(1+\exp(\alpha|u|)/2$ in advance, using an inverse $MTF^{-1}(\alpha, u)$ of the above.

The most conventional method for applying the frequency processing being equivalent to MTF–1($\alpha$, u) is a method of employing a two-dimensional mask processing. Although it is possible to employ the convolution calculating operation for the two-dimensional mask processing mentioned above, it is also applicable to employ the multiple-resolution method in which the original image signal is divided into image signals having a plurality of (M number of) resolution characteristics, and a new image is created by multiplying appropriate weighted coefficients Cm (m=0, 1, - - - , M) and adding them. Incidentally, the more the number of unsharp masks M is, the more idealistic frequency processing can be achieved.

FIG. 6(a), FIG. 6(b), FIG. 6(c) and FIG. 6(d) are explanatory figures of a resolving operation using the two-dimensional mask processing, and concretely, show an example in which two-dimensional mask of 7×7 is resolved into three unsharp sub-masks. Each of 81 number of squares (9×9=81) shown in each of FIG. 6(a), FIG. 6(b), FIG. 6(c) and FIG. 6(d) indicates each of pixels two-dimensionally arranged, and the black-colored square located at the center position is a target pixel for which the unsharp image signals should be found. The peripheral area of the black-colored square surrounded by the solid lines is equivalent to a pixel area being a calculating object when finding the unsharp image signals in regard to the target pixel. While, the outside area, not surrounded by the solid lines, is equivalent to another pixel area, which is not a calculating object when finding the unsharp image signals in regard to the target pixel.

FIG. 6(a), FIG. 6(b), FIG. 6(c) and FIG. 6(d) show the areas of calculating the unsharp image signals in regard to the original image signal (the sub-mask of 1×1), the sub-mask of 3×3, the sub-mask of 5×5, the sub-mask of 7×7, respectively. Initially, the unsharp image signals of S0, S1, S2, S3 are generated by affecting the unsharp masks, sizes of which are different relative to each other, to the original image signals representing the two-dimensional image. For instance, each of the unsharp image signals can be calculated by employing the unsharp masks as the simple mean masks.

Incidentally, the term of "simple mean mask", referred herein, represents a mask processing for finding an average value of all pixels residing in a calculating range of the unsharp image signals. For instance, in the sub-mask of M×N, all of the mask coefficients in regard to all pixels are constant value of 1/MN.

Successively, corrected image signals are found by applying the integration-adding calculation using the unsharp image signals of S0, S1, S2, S3. When weight coefficients for the unsharp image signals of S0, S1, S2, S3 are C0, C1, C2, C3, respectively, the image signals Sproc after the image processing can be calculated by the equation of Sproc=ΣCmSm (m=0–3). As mentioned above, by performing the calculation after resolving the two-dimensional mask into a plurality of unsharp sub-masks, it becomes possible to apply the two-dimensional mask processing to the original image signals while decreasing the memory capacity and the number of calculation times. For instance, in case of the two-dimensional mask processing of 7×7, according to the conventional two-dimensional mask processing, it is necessary to store all of weight coefficients, number of which is 7×7=49, and to retrieve each of them one by one from the memory when performing the calculation. According to the present invention mentioned in the above, however, by performing the calculation after resolving the two-dimensional mask into a plurality of unsharp sub-masks, it becomes possible to perform the two-dimensional mask processing at a higher velocity than ever only by storing the mask-size and weight coefficient Cm.

Figure 7:
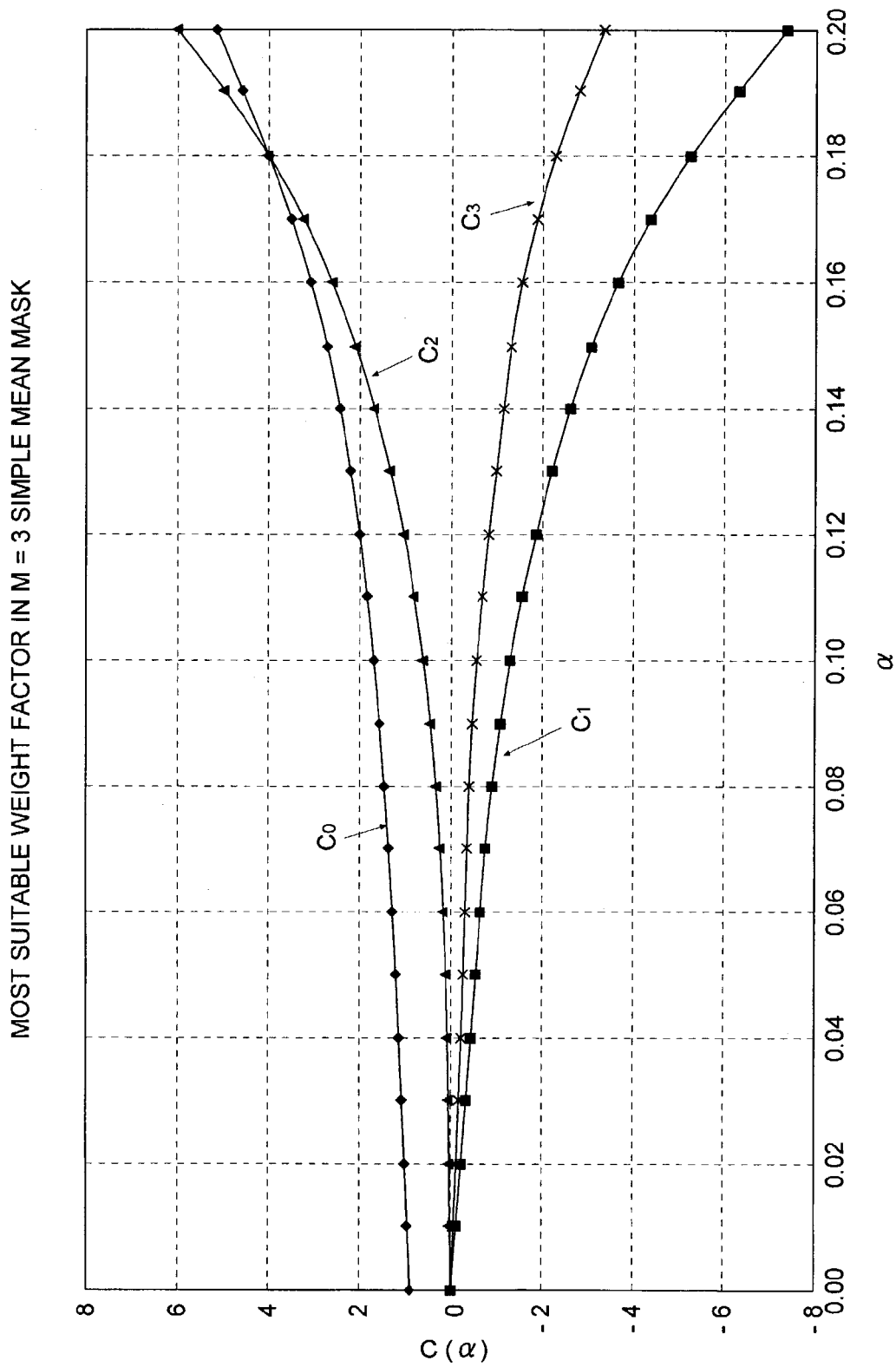
FIG. 7 is an explanatory figure on an embodiment example of the present invention.

FIG. 7 shows an example of the weight coefficient setting in respect to unsharp image signals. Concretely speaking, the optimum weight coefficients in the simple mean masks shown in FIG. 6(a), FIG. 6(b), FIG. 6(c) and FIG. 6(d) are indicated, and the horizontal axis is the sharpness information $\alpha$, while the vertical axis is the weight coefficients (C0–C3). As shown in the drawing, it is desirable that Cm can be determined for one parameter as a simple correspondence. It is also desirable, however, that Cm is a function for more than two parameters.

If the sampling size equivalent to the actual size of each pixel in an image signal is $\Delta s$, the modulation transfer function of the simple mean filter is expressed by Fm(u) =sinc((2m+1)$\pi u \Delta s$), where sinc(x) means sinc(x)=sin x/x. Therefore, it is the most preferable if $MTF^{-1}(\alpha, u) \approx \Sigma Cm$ ($\alpha$)·Fm(u) holds true, and the most appropriate Cm($\alpha$) is obtained using an optimizing algorism such as the least square. The result is shown in FIG. 7. Herein, it is intended that $\Sigma Cm=1$ holds true with any $\alpha$.

When an output pixel size equivalent to the smallest record size, of which output can be controlled in the image recorder, is denoted $\Delta s'$, the image-interpolating magnification factor $\delta$ is expressed as $\delta=\Delta s/\Delta s'$. In order to perform suitable sharpness level correction in accordance with the output size, image interpolation processing is first performed using the image-interpolating magnification factor of $\delta$, and then the sharpness information $\alpha$ is replaced with $\alpha/\delta$ and the processing for correcting the sharpness level is performed. The image interpolation methods known to us include simple interpolation (in case of image interpolation by integral multiplication), linear interpolation, and spline interpolation, but not limited thereto.

When the image interpolation processing is for enlargement interpolation, that is, in case $\delta>1$, number of image signal data after the image interpolation increases. It, therefore, is preferable to perform the sharpness level correction processing first, using the sharpness information $\alpha$, and then perform the image interpolation processing, because number of computations in the image processing decreases. On the other hand, when the image interpolation processing is for reduction interpolation, that is, in case $\delta<1$, number of image signal data after the image interpolation decreases. It, therefore, is preferable to perform the image interpolation processing first, and then replace the sharpness information $\alpha$ with $\alpha/\delta$ and perform the sharpness level correction processing, because the number of computations in the image processing decreases. Although the threshold of the image-interpolating magnification factor that determines the processing turn of the image interpolation processing and sharpness level correction processing is set to $\delta=1$ herein, the threshold can be changed freely according to the correction accuracy of the sharpness level and allowable image processing time.

FIG. 18(a) shows the pre-processing (2) performed in the image processing means 110.

<Pre-Processing (3): Sharpness Compatibility>

Next, an example of the sharpness compatibility processing by a sharpness comparing means is explained hereunder. The "sharpness compatibility" means to compare the information on the image characteristic (to be described later) with the sharpness information of the output object obtained as a result of performing the image conversion step based on the image signal representing the afore-mentioned test pattern. In the present embodiment, information on the image feature means test pattern information on the image signal representing the test pattern, but it can be the image feature itself.

"Test pattern information" means image signal representing a test pattern and, at the same time, the information must be on the test pattern before performing the image conversion step. Test pattern information can be any combination of, for example, the highest signal value SH in the rectangular wave chart, lowest signal value SL, amplitude Save= (SH+SL)/2, and signal differential ΔS=SH−SL, because the chart profile is fixed by using any two characteristics of these. Test pattern information can also be the spatial frequency specific to the rectangular wave chart.

"Information supply" in FIG. 18(a) means handing over the known "test pattern information" to the other.

For example, a method employing a neural network is suitable for comparing the test pattern information {β} on the image signal representing a test pattern like the rectangular wave chart with the sharpness information {α} on the test pattern. To be concrete, have the network learn using the test pattern information and sharpness information as a learning set (list of input/output pairs). When the test pattern information {β} extracted from the test pattern is inputted into the network that has completed learning, the processing is complete as the sharpness information {α} is outputted.

FIG. 18(a) shows the pre-processing (3) wherein the test pattern information {β} 311 is inputted and the sharpness information {α} 310 is outputted.

Figure 8:
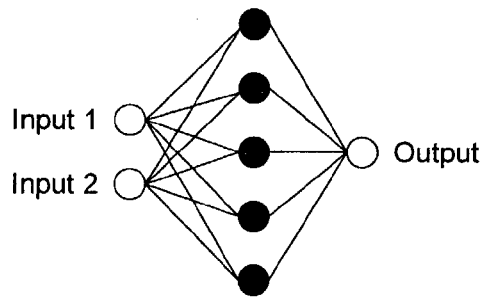
FIG. 8(a), FIG. 8(b) and FIG. 8(c) are explanatory figures on an embodiment example of the present invention.
Figure 8:
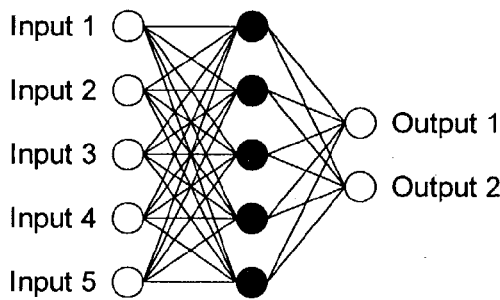
Figure 8:
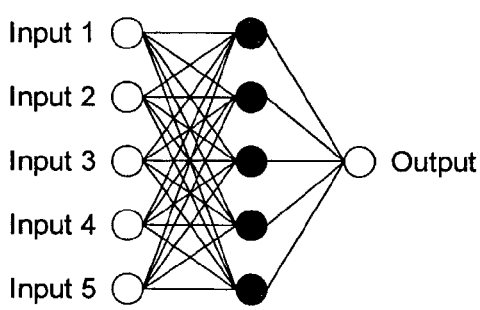

FIG. 8(a) shows a brief diagram of the sharpness adaptive calculation using a neural network. In the embodiment example, it is a network comprising two-layer perceptron, for which a learning method based on the error inverse-propagation is employed. Perceptron and error inverse-propagation method are described in detail in "Neural Computer: Approach from Statistical Physics" (written by J. Hearts, A. Claw, R. G. Palmer; translated by Tatsuya Sasagawa, Isamu Kure; published by Toppan Co.; 1994, pages 109–139, 141–147).

The network comprises two input elements (Input1, Input2), intermediate layer with five elements, and one output element (Output). Each element can take a continuous value within a range of [0, 1]. The network, wherein the input elements are connected to each intermediate element, and the intermediate elements to the output element, is so structured as to transfer information from the input elements to the output element. When information is inputted in the network, individual computation is executed for each element depending upon the intensity of the synapse coupling between each element, and the output result is obtained through the intermediate layer. Adjusting the synapse coupling between each element by the error inverse-propagation method, continue letting the network learn until the output resulting from the input {β} becomes equal to {α}.

In this embodiment example, two pieces of test pattern information SH/Smax and SL/Smax in the rectangular wave chart are inputted into the input elements. Herein, SH and SL mean the highest signal value and lowest signal value in the rectangular wave chart, respectively, and Smax is the minimum image signal value, which, for example, is Smax=4095 in an image with 12-bit graduation. The sharpness information α/αmax corresponding to the result of the sharpness level evaluation of the rectangular chart is outputted to the output element. Herein, αmax is the maximum of α, representing the possible extent of the sharpness level correction.

Learning for achieving the objective of the sharpness comparing means is explained hereunder. When the highest signal value, lowest signal value and sharpness information of the k-th rectangular chart are denoted SHk, SLk and αk, respectively, the objective is achieved when SHk/Smax and SLk/Smax are inputted in terms of every k and α/αmax is outputted.

If the intensity of the synapse coupling between each element at the time of the completion of learning, and when a piece of information on the rectangular wave chart is inputted to the network, an output result corresponding to the chart profile can be obtained. When this is realized, an output result based on actual learning is retrieved in the network and, even when any information on a rectangular wave chart about which the network has not learnt actually is inputted, an output exhibiting the tendency of the chart can be obtained. For example, as shown in FIG. 4(a) and FIG. 4(b), we have actually confirmed that, in case of an image recorder in which the sharpness tends to decrease as the image signal value increases, an output result exhibiting the tendency is obtained.

<Pre-Processing (4): Extraction of Image Feature>

Next, an example of extraction of the image feature is described hereunder. FIG. 18(a) shows the pre-processing (4) for extracting the image feature {γ} 312.

"Image feature" can be any quantity that characterizes the image. For example, a quantitative value calculated from the image signal value can be used, but not limited thereto, and any quantified value of subjective evaluation can be used instead. In addition, the characteristic quantity of an image needs not be limited to a function of the original image or unsharp image but can be any characteristic quantity including a physical structure such as bone or organ of a subject, a shape being such as oblong or circular, and size of the shape. Extracting the image feature enables to find out the image structure in the periphery of each pixel in the image signal. The "image structure" means, as a whole, qualitative or quantitative image characteristics of each pixel. For example, qualitative characteristic means the characteristic that can be detected visually, such as portion, shape, and contour, and quantitative characteristic means the characteristic that is represented by a value, such as local density, and existence of cyclic structure. In this embodiment example, five characteristic quantities <1> S0/Smax, <2> S3/Smax, <3> |S0−S1|/Smax, <4> 51 S1−S2|/Smax, and <5> |S0−S2|/Smax are obtained from the original image signal S0 and three unsharp image signals S1, S2 and S3.

Herein, S0 is the original image and Sm means the processed image masked with the m-th unsharp mask (m=1, 2, 3). Taking the rectangular wave chart for example, <1> and <2> are equivalent to a local mean in terms of the image structure and <3>, <4> and <5> are equivalent to the amplitude in terms of, the image structure.

In a computation for determining the weight factor of each pixel, wherein the image feature of the pixel in question is used, it is acceptable to use the image feature of an adjacent pixel instead of the above. To be concrete, in obtaining the image feature of a pixel (i, j) in the two-dimensional image signal, it is acceptable to use a simple mean mask S2 (i−1, j+1) of the mask size of 5×5 for the pixel (i−1, j+1) for the computation, or it is also acceptable to use S2 (i−1, j+1) S2 (i, j) as the image feature on the pixel (i, j).

<Pre-processing (5): Image Structure Check-Up Based on Image Feature>

Next, an example of image structure check-up computation is explained hereunder. The "image structure check-up" is to extract the image feature of each pixel and its periphery in the original image signal before performing the sharpness level correction processing and check up the quantity with the test pattern information. In other words, it means to extract the image feature of each pixel and its periphery in the original image signal and analogize a test pattern that most resembles to the characteristic quantity in terms of the image structure. This means, for example, to extract the image feature of a pixel and analogize that an adjacent pixel "has the image structure of a rectangular wave equivalent to one with amplitude ΔS and spatial frequency Uo".

This pre-processing can be completed in a similar manner for the pre-processing (2), using the afore-mentioned neural network. For example, it is sufficient that the image feature $\{\gamma\}$ of the original image signal before performing the sharpness level correction processing is compared with the afore-mentioned test pattern information $\{\beta\}$. FIG. 18(a) shows the relationship between the image feature $\{\gamma\}$ 312 in the pre-processing (3) and the test pattern information $\{\beta\}$ 311.

To be concrete, have the network learn using the image feature, extracted from the test pattern image, and test pattern information as a learning set (list of input/output pairs). When the image feature $\{\gamma\}$ extracted from the test pattern is inputted into the network that has completed learning, the processing is complete as the test pattern information $\{\beta\}$ is outputted.

FIG. 8(b) shows a brief diagram of the image structure check-up system using a neural network. In the embodiment example, it is a network comprising two-layer perceptron, for which a learning method based on the error inverse-propagation is employed.

The network comprises five input elements (Input1 to Input5), intermediate layer with five elements, and two output elements (Output1, Output2). Each element can take a continuous value within a range of [0, 1]. The network, wherein the input elements are connected to each intermediate element, and the intermediate elements to the output element, is so structured as to transfer information from the input elements to the output element. When information is inputted in the network, individual computation is executed for each element depending upon the intensity of the synapse coupling between each element, and the output result is obtained through the intermediate layer. Adjusting the synapse coupling between each element by the error inverse-propagation method, continue letting the network learn until the output resulting from the input $\{\gamma\}$ becomes equal to $\{\beta\}$.

In this embodiment example, five pieces of quantities representing the image feature in the rectangular wave chart, that is, SV1 to SV5, (SV1) S0/Smax, (SV2) S3/Smax, (SV3)|S(0)−S(1)|/Smax, (SV4)|S(1)−S(2)|/Smax, and (SV5)|S(0)−S(2)|/Smax are inputted.

Herein, SV1 to SV5 are the characteristic quantity in the rectangular wave chart, respectively, and Smax is the maximum image signal value, which, for example, is Smax=4095 in an image with 12-bit graduation. Two pieces of the test pattern information SH/Smax and SL/Smax in the rectangular wave chart are outputted to the output element.

Learning for achieving the objective of the sharpness comparing means is explained hereunder. When the five characteristic quantities in the k-th rectangular wave chart are denoted SV1k to SV5k, two pieces of the test pattern information are denoted SHk/Smax and SLk/Smax, the objective is achieved when SV1k to SV5k are inputted in terms of every k and SHk/Smax and SLk/Smax are outputted.

If the intensity of the synapse coupling between each element at the time of the completion of learning, and when the characteristic quantity of the rectangular wave chart is inputted to the network, the test pattern information on the rectangular wave chart, which is the information on the highest signal value and lowest signal value in this embodiment example, can be obtained. When this is realized, an output result based on actual learning is retrieved in the network and, even when information on any image about which the network has not learnt actually is inputted, an output exhibiting the tendency of the image can be obtained. For example, as shown in FIG. 4(a) and FIG. 4(b), we have actually confirmed that, in case of an image recorder in which the sharpness tends to decrease as the image signal value increases, an output result exhibiting the tendency is obtained.

The image feature $\{\gamma\}$ can be a quantitative value calculated from the image signal value as described in this embodiment example, but not limited thereto, and any quantified value of subjective evaluation can be used instead. In addition, the characteristic quantity of an image needs not be limited to a function of the original image signal or unsharp image signal but can be any characteristic quantity including a physical structure such as bone or organ of a subject, a shape being such as oblong or circular, and size of the shape.

FIG. 8(c) shows a diagram where the processing 1 and processing 2 are integrated into one network. The explanation above has been made on the "sharpness compatibility" and "image structure check-up" separately for the sake of convenience, but they can be processed in one time if the output element of the "image structure check-up" network and the input elements of the "sharpness compatibility" network are connected each other to integrate the two networks. In this figure, the network comprises two-layer perceptron and a learning method based on the error inverse-propagation is employed, where the image feature SV1 to SV5 are inputted to the input elements (Input1 to Input5) and the sharpness information α is outputted from the output element (Output). It is preferable to omit an intermediate computation on the "test pattern information" and employ a network computation that correlates the "image structure set-up" and "sharpness information" as shown in the figure, because the computation steps can be reduced from two to one. As a result, the integrated network itself turns to be nothing but a "sharpness compatibility" network.

The neural network in FIG. 8(a) to (c) may be a single layer network (input layer and output layer), but use of a multiple layer network (input layer, output layer, and one or more intermediate layers) is preferable to improve the calculation accuracy.

A suitable method for comparing $\{\alpha\}$ with $\{\beta\}$, $\{\beta\}$ with $\{\gamma\}$, or $\{\alpha\}$ with $\{\gamma\}$ is not limited to neural network but the least square method is also applicable. For example, in comparing $\{\alpha\}$ to $\{\gamma\}$, αk is used as the sharpness information of the k-th test pattern and γk is used as the image feature extracted from the test pattern. For example, it can be a possible method for calculating γk that an equation γk= (a·{Sk(0)−Sk(1)}+b){c·Sk(M)+d} is employed and each a, b, c and d is determined so that the error-square-sum $\Sigma(\alpha k - \gamma k)^2$ becomes smallest. An equation for calculating the image feature γk is not limited to the above, and use of more complicated equation enables to extract the image feature and compare it with the sharpness information based on the chart image more appropriately.

The sharpness information $\{\alpha\}$ can be an index value itself such as MTF, SWTF or ARTF obtained through physical evaluation, or, when approximating the spatial frequency characteristic using a specified function type, a parameter specific to the function type may be applied.

Various ways can be thought out, including, for example, a case where the MTF characteristic is regarded as a Gauss function, in which its value is 1 at the zero frequency and MTF attenuates as the spatial frequency increases, and the standard deviation obtained through the least square or the like is regarded the sharpness information $\{\alpha\}$. Naturally, the approximation expression for MTF may be a polynomial or Lorentz function, and the type of the function does not matter provided that the MTF characteristic can be approximated precisely. Different methods other than the above can be applied also to the sharpness adaptive calculation.

<Suitable Sharpness Correction (Retrieving Phase)>

The sharpness correction in the retrieving phase is explained hereunder. FIG. 18(*b*) shows an outline of processing in the retrieving phase. In this phase, appropriate sharpness level correction can be performed for an image signal that needs to be corrected of its sharpness level.

In this embodiment example, the image feature $\{\gamma\}$ 312 is extracted (Computation (1) in FIG. 18(*b*)) from an image that needs to be corrected of its sharpness level; the image structures in the periphery of each pixel are checked up (Computation (2) and Computation (3) in FIG. 18(*b*)) based on the image feature $\{\gamma\}$ 312; and appropriate sharpness correction is performed (Computation (4) in FIG. 18(*b*)) in the image processing means 110 based on the analogized sharpness characteristic. Then, the result is outputted, as needed, in the form of hard copy from the image recording means 121. With this processing, appropriate sharpness correction can be performed even on any image signal that does not form a test pattern like a rectangular wave chart.

Although the sharpness information and correction parameter are set as one same object in the present embodiment example, but it is of no restriction. If the sharpness information and correction parameter are not the same one, it will be sufficient to provide another means for relating them to each other. It is preferable, however, to set the two as one same object as in this embodiment example, because computation can be simplified and processing time can be reduced.

Figure 9:
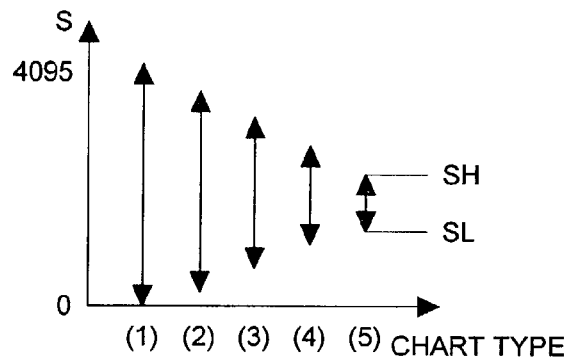
FIG. 9(a), FIG. 9(b), FIG. 9(c) and FIG. 9(d) are explanatory figures on an embodiment example of the present invention.
Figure 9:
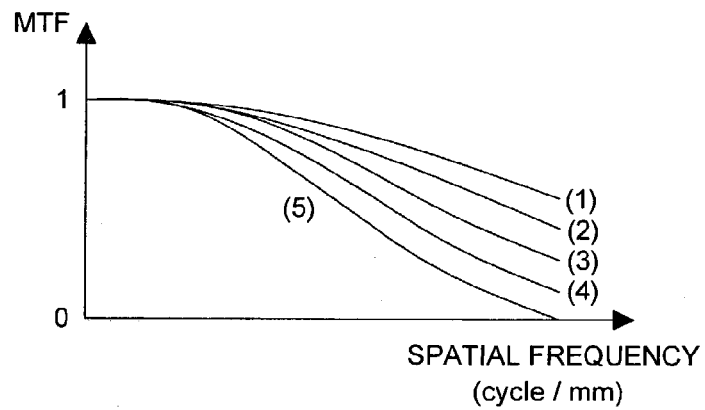
Figure 9:
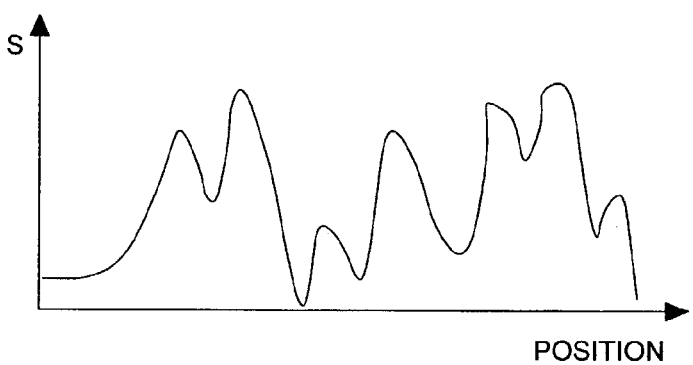
Figure 9:
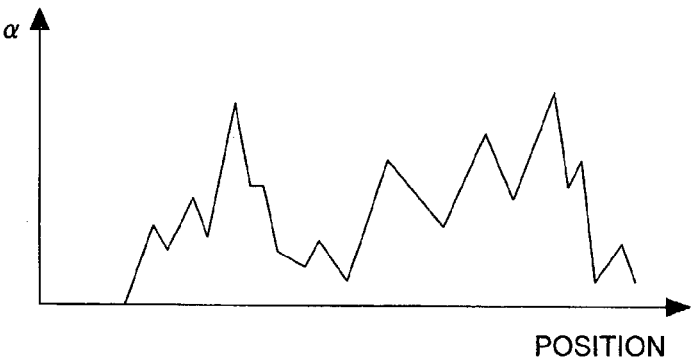

FIG. 9(*a*), FIG. 9(*b*), FIG. 9(*c*) and FIG. 9(*d*) show an effect of the sharpness level correction, taking an actual profile for example. The image recorder is assumed to have a tendency that, when the sharpness level is measured using a rectangular wave chart where the image signal amplitude decreases gradually as in FIG. 9(*a*), the sharpness level decreases as the image signal amplitude decreases as in FIG. 9(*b*). FIG. 9(*c*) is an example of image signal value profile, and FIG. 9(*d*) shows the positional characteristic (profile) of the correction parameter α determined by the sharpness level comparing means of the present embodiment example. When an image based on the image signal shown in FIG. 9(*c*) is recorded using the above image recorder, because α is restrained in areas with greater image signal amplitude and exaggerated in areas with smaller image signal amplitude, a hard copy on which deteriorated sharpness level is appropriately corrected at any position (area) can be obtained.

<Effect of Sharpness Correction>

The easiest way to verify the effect of the sharpness level correction by the present embodiment example is to produce each image (hard copy), recorded on a recording medium by the image recorder, based on the original image signal and on the processed image signal subjected to the sharpness level correction of the original image signal, and compare with each other and evaluate the effect by visual observation or physical evaluation of the images. In this way, the correction effect can be verified qualitatively.

Figure 10:
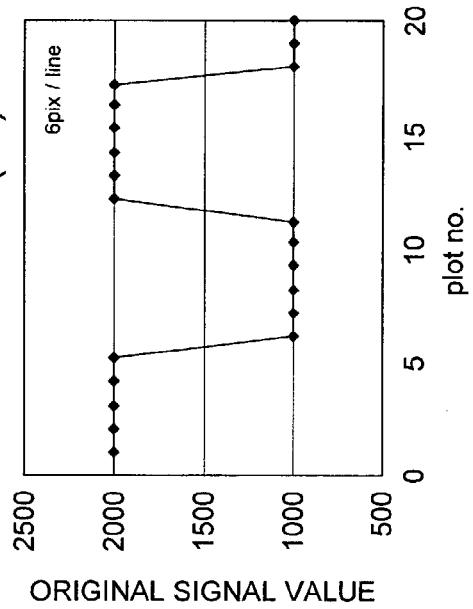
FIG. 10(a), FIG. 10(b), FIG. 10(c) and FIG. 10(d) are explanatory figures on an embodiment example of the present invention.
Figure 10:
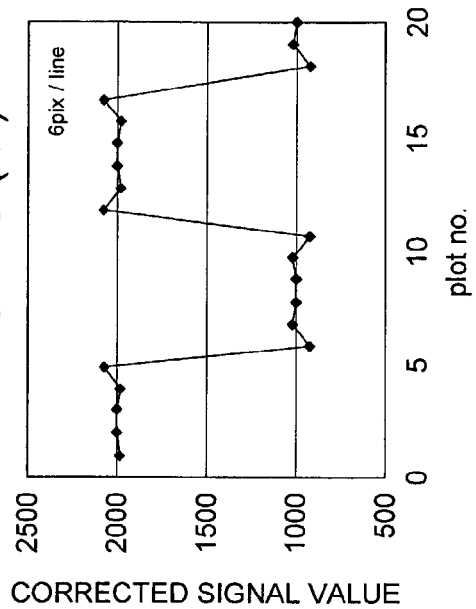
Figure 10:
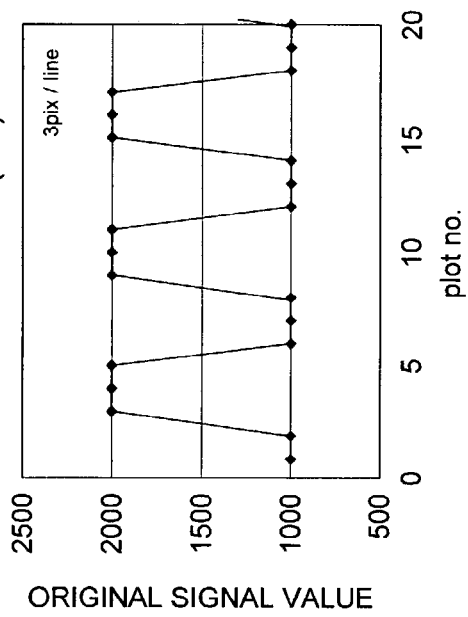
Figure 10:
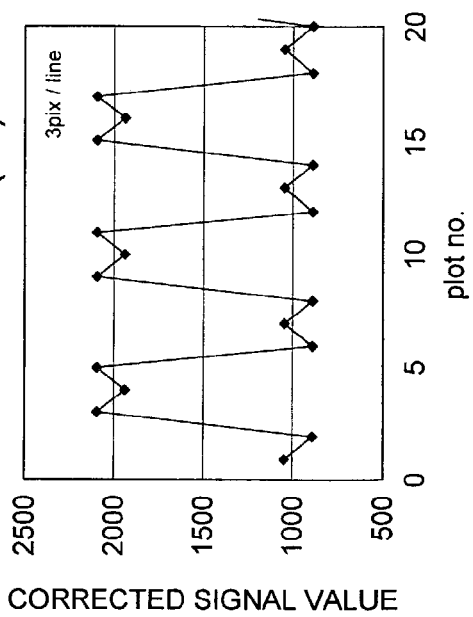

FIG. 10(*a*), FIG. 10(*b*), FIG. 10(*c*) and FIG. 10(*d*) show an example of the relationship between the image profile (signal value profile) and the correction parameter. FIG. 10(*a*) shows the signal value of an original signal having 3 pixels per line and FIG. 10(*b*) shows the signal value of the image that has been corrected on 3 pixels per line by the present embodiment example.

FIG. 10(*c*) shows the signal value of an original signal having 6 pixels per line and FIG. 10(*d*) shows the signal value of the image that has been corrected on 6 pixels per line by the present embodiment example.

Figures 11, 12:
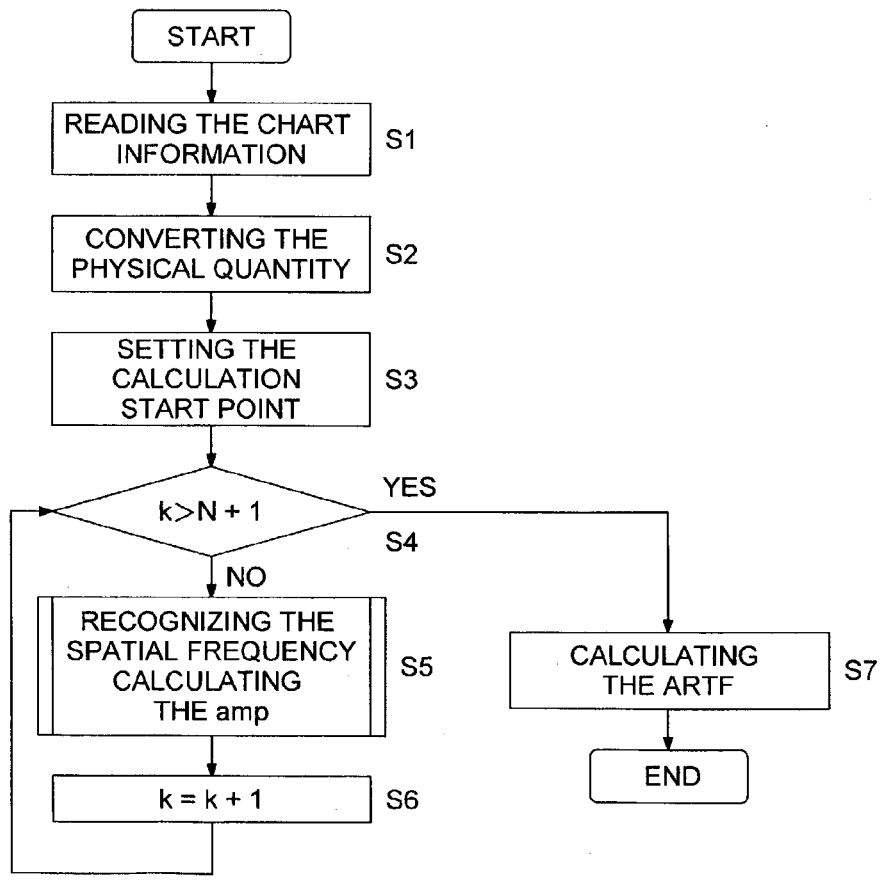
FIG. 11 is an explanatory figure on an embodiment example of the present invention.
FIG. 12 is an explanatory figure on an embodiment example of the present invention.

FIG. 11 shows the result of functional evaluation through visual observation of mammography. For the functional evaluation, breasts are photographed on intensified paper CM-100/film New CM-H, the film is developed on an automatic developing machine TCX-201, the photos are digitized into image signals on a film digitizer LD-5500 (all manufactured by Konika Co., Ltd.), and then the images for diagnosis are recorded on a recording medium, using an ink-jet recorder (prototype). The film was processed for development under a condition of development temperature 35° C. and drying temperature 32° C. for 90 seconds. The example of the prior art is an image that is recorded without being subjected to the sharpness level correction, and each embodiment example 1 to 4 is an image that is recorded after being subjected to some sharpness level correction. The embodiment example 1 is an image subjected to the sharpness level correction processing using 2 unsharp masks (simple mean mask of m=1 to 2, of which mask size is 3 and 5 because the mask size of the m-th simple mean mask is (2 m+1)). The embodiment example 2 is an image subjected to the sharpness level correction processing using 3 unsharp masks (simple mean mask of m=1 to 3, of which mask size is 3, 5 and 7). The embodiment example 3 is an image subjected to the sharpness level correction processing using 4 unsharp masks (simple mean mask of m=1 to 4, of which mask size is 3, 5, 7 and 9). The embodiment example 4 is an image subjected to the sharpness level correction processing using 5 unsharp masks (simple mean mask of m=1 to 5, of which mask size is 3, 5, 7, 9, and 11). Each image is place on a film viewer with the illuminance of 10,000 lx. for subjective evaluation through visual observation of the resolution of micro-calcification in the breasts. In the observation, the resolution of the micro-calcification is evaluated into four grades of "⊚", "○", "Δ" and "x" (wherein the judgment criterion is "⊚": Extremely high, "○": High, "Δ": Fairly low, and "x": Not detectable because of blurred microstructure).

As a result of the functional evaluation, it is confirmed that the sharpness level correction can be performed with sufficient accuracy provided that the number of unsharp masks is three or more. With the image processing method according to the present embodiment example, it becomes possible to appropriately correct the sharpness level of a microstructure like micro-calcification having a size as small as several-tens micrometer without losing its shape.

Next, a more objective way for verifying the effect of the sharpness level correction is described hereunder. To check the variation between the sharpness level characteristics before and after the image conversion step, it will be the easiest to visually observe and compare things in the same state as explained above. Comparison, however, is sometimes difficult because the image information contained in two objects to be compared with each other, such as subject to be photographed and image signal or image signal and hard copy, has different state. Explained hereunder is an example of verifying the effect of the sharpness correction in each image conversion step through physical evaluation of the image.

When the image conversion step is performed in an image recorder, generate an image signal (original image signal) representing the rectangular wave chart, to start with, and obtain the processed image signal (corrected image signal) of which frequency has been exaggerated taking into account the deterioration of the sharpness level in the original signal caused in the image recorder. And then, record the rectangular wave chart on an recording medium based on the image signal, and measure a density profile of the rectangular wave chart, using a micro-densitometer, to see if the sharpness level is constant (in case of MTF value, it is approximately 1 at the end spatial frequency). Although the result varies by method applied for the sharpness level evaluation, it goes true that the sharpness levels before and after the image conversion step become approximately equal if the sharpness level in the density profile falls within a range of 0.85 to 1.15. That the sharpness levels before and after the image conversion step "become approximately equal" means each of the images before and after the image conversion step has the information of nearly equal quantity in each spatial frequency band.

The range 0.85 to 1.15, in which it can be judged that the sharpness levels before and after the image conversion step is approximately equal, has been determined through the functional evaluation by visual observation of a hard copy recorded by the afore-mentioned image recorder, and deterioration of the sharpness level can hardly be recognized by visual observation so far the sharpness level is within the above range. Since minute difference in the sharpness level can be detected satisfactorily by visual observation particularly in a relatively low frequency band of 0 to 3.0 cycle/mm, it is preferable to perform the sharpness level correction so that the sharpness levels before and after the image conversion step become approximately equal within a range of 0 to 3.0 cycle/mm.

Even in an image conversion step that is performed by other type of device than image outputting device, being approximately equal or not can be judged, in a similar manner as in the case using the image recorder, by checking whether the ratio between the sharpness levels before and after the image conversion step is within a range of 0.85 to 1.15. The ratio between the sharpness levels before and after the image conversion step means (sharpness level of an output object)/(sharpness level of an input object).

When the image conversion step is performed in an image display, generate an image signal (original image signal) representing the rectangular wave chart, and obtain the processed image signal (image signal corrected with exaggerated sharpness level) of which sharpness level has been exaggerated from the original image signal through some exaggeration processing. And then, display the rectangular wave chart image on a display screen based on the image signal, photograph the display screen with a photographing device such as CCD camera, and measure a luminance profile of the rectangular wave chart. Then, find the sharpness level based on the luminance profile and see if the sharpness level is constant (in case of MTF value, it is approximately 1 at the end spatial frequency).

When the image conversion step is performed in an image inputting device, photograph a subject having definite contour, such as lead chart, slit or step wedge, to obtain the image signal representing the subject, to start with, and obtain the processed image signal (corrected image signal) of which frequency has been exaggerated taking into account the deterioration of the sharpness level in the original signal caused in the image inputting device. And then, measure the sharpness level on the corrected image signal to see if the sharpness level is constant (in case of MTF value, it is approximately 1 at the end spatial frequency). Herein, because it is difficult to obtain an original image signal that is equivalent to the contour of the subject, the contour of the subject is analogized based on the gradation characteristic (for example, X-ray irradiation quantity vs. signal value characteristic) of the image inputting device. That is to say, it is assumed that the original image signal equivalent to a lead chart exhibits a rectangular wave which maintains its amplitude at any high spatial frequency.

When the image conversion step is performed in an image processor, generate an image signal (original image signal) representing the rectangular wave chart, to start with, and obtain the processed image signal (image signal corrected with exaggerated sharpness level) of which sharpness level has been exaggerated from the original image signal through some exaggeration processing. And then, perform the sharpness level correction processing for correcting the sharpness level so as to cancel the sharpness level exaggeration processing to obtain the processed image signal (corrected image signal). Then, find the sharpness level of the corrected image signal to see if the sharpness level is constant (in case of MTF value, it is approximately 1 at the end spatial frequency).

Besides, the present embodiment example is also applicable to the image processing step or image displaying step. Since the output object in the "image processing step" is an image signal, it is possible, for example, to generate an image signal equivalent to the rectangular wave chart and evaluate the sharpness level by computation based on the profile data of the processed image. Since the output object in the "image displaying step" is the illuminance or luminance near the display surface, it is possible, for example, to photograph the object by a CCD camera and return it to an image signal to evaluate the sharpness. Evaluation is not limited to physical evaluation, but quantifying the result of subjective evaluation through visual observation is also acceptable.

<Supplementary Explanation>

The "mask" in the above description is an object relating to the range or weight factor acting upon the peripheral pixels in an image signal, and defined as "an object that gives a (un-) sharpness effect in terms of positional space". On the other hand, the "filter" is an object representing an exaggerating and attenuating effect in each frequency band, and defined with a nuance "an object that gives a (un-) sharpness effect in terms of spatial frequency". Conventionally, however, they have been frequently used in mixture, and so "mask" and "filter" are regarded as same one in the present embodiment.

ARTF, referred in the above description, means the sharpness level evaluation index about which the inventor of the present invention has applied for patent under Japanese Patent Application No. 2001-224493. FIG. 12 shows a flowchart for analyzing ARTF, wherein the spatial frequencies of a sine wave acting upon the profile are selected by small increment, with the calculation start point fixed, and subjected to discrete Fourier transformation, and a desired spatial frequency is detected based on the calculation result.

S1 in FIG. 12 reads the chart information. The information may include, for example, density profile of the chart image, re-sampling interval of the densitometer, number of the chart elements, design spatial frequency of each chart element, number of lines of the chart element, target calculation start point, type of the chart to be used, and any other supplementary information on the chart that is necessary to speed up the analysis.

S2 of FIG. 12 converts the physical quantity as needed. Density profile is mostly used as the physical quantity for image evaluation in the medical field but, not limited thereto, transmittance or contrast profile can be used instead as needed by application.

S3 of FIG. 12 sets the calculation start point and calculation range. The calculation start point must be selected at one point on the profile having continuous cyclic waveform, and improper setting results in serious error in the calculation result. When the shape of the chart image profile is already known, the target calculation start point that has been read into in S1 (to be concrete, a plot number corresponding to each chart element) can be used. However, since the density measurement start point is indefinite, it is desirous to set the point in accordance with each profile. When setting the calculation range, it is important to meet the spatial frequency of the output chart image with that of the active sine wave. To reduce error in the calculation, calculation distance must be set to the cycle of the output image or to an integral multiple of the cycle.

The calculation start point must be selected at one point on the profile having continuous cyclic waveform, and improper setting results in serious error in the calculation result.

FIG. 13(a) is an explanatory figure showing an example of setting the calculation start point for Fourier analysis in each chart element. For the sake of ease, FIG. 13(a) takes for example a chart image density profile with three (N=2) chart elements. To start with, find the density peak, high level DH(Uk) and low level DL(Uk) in each spatial frequency Uk. Then, select D* with which DH(Uk)<D*<DL(Dk) holds true for any i. In FIG. 13(a), for example, any D* is acceptable provided that Dmin(U2)<D*<Dmax(U2) holds true. Any marked (○) portion on the first transition of each peak can be selected as the calculation start point=P0(Uk). To select each po(Uk), the boundary on the charted portion of each spatial frequency must be recognized. When, for example, the evaluation is always done using a chart image of similar shape, and provided that a target calculation start point is stored beforehand or an inputting means is provided, making the best of a fact that the profile shape is always nearly equal, the calculation start point can be easily set based on the given information. Besides, this information can be replaced by other chart information such as the number of the chart elements and each spatial frequency, number of peaks of each chart element, and distance between the chart elements.

FIG. 13(b) shows the range for calculating the amp of the chart image profile. Because the peak profile may be different on a peak at each end and it can result in different calculation result, it is preferable not to use all peaks for the calculation but to analyze multiple consecutive peaks near the center. Ten peaks are shown in the figure but using the central seven cycles of peaks is preferable for the calculation.

S4 of FIG. 12 judges whether the calculation of amp has completed for all chart elements. When a chart comprising (N+1)-number of chart elements of different spatial frequencies (U0, U1, . . . , UN) is employed, the processing is repeated (S4 of FIG. 12 to S6 of FIG. 12) until the calculation of all amp(Uk) (k=0, 1, . . . , N) are complete. Upon completion of the calculation, normalize amp(Uk), using a normalization spatial frequency, to obtain ARTF (amplitude-rate transfer function) (S7 of FIG. 12). ARTF is calculated in an equation:

$$ARTF(Uk)=amp(Uk)/amp(U0)$$

As a result of finding the rectangular wave chart through direct Fourier transformation using the above ARTF, it becomes possible to perform more strict sharpness level correction corresponding to the frequency characteristic.

Besides, it is likely to carry out periodic maintenance of each device so as to obtain favorable image quality all the time. If, for example, a chart image is stored in the image recorder and a means for inputting the measurement result of the image is provided, tuning the image quality becomes possible. By repeating the steps of generation of image→printing→evaluation→result→ . . . , favorable image quality becomes available at any time.

When decoding Snew: processed image signal, Sm: original image signal (m=0 in case of the original image signal) or unsharp image signal generated through the m-th unsharp masking processing (m=1 to M in case of the unsharp image signal), Cm: weight factor in the original image signal (m=0 in case of the original image signal) or weight factor in the m-th unsharpe image signal (m=1 to M in case of the unsharp image signal), it is preferable that the afore-mentioned frequency processing is performed based on a computation formula:

$$Snew=\Sigma CmSm$$

Furthermore, in case of a two-dimensionally configured image signal, where the sharpness level characteristic, for example, in the main scan direction differs significantly from that in the sub scan direction (in other words, anisotropic by the scan direction), a two-dimensional unsharp mask that meets the characteristic can satisfactorily be employed. Otherwise, to reduce the processing time, it is acceptable to find a mean of the sharpness characteristics in the main scan direction and sub scan direction and perform the sharpness correction based on the mean.

Besides, in this embodiment example, the unsharp mask can be a two-dimensional Gauss function type filter or Laplacian filter, not limited to a simple filter of Nh×Nv (Nh: vertical mask range, Nv: horizontal mask range), and any combination of similar filters with different resolution is applicable to the embodiment example. The masking processing using a binomial filter obtained through repeated processing with a 2×2 simple mean filter is explained hereunder.

FIG. 14 shows a 2×2 simple mean filter used in this embodiment example. It is understood from FIG. 14 that the weight is ¼ at any section and therefore this is a simple mean filter. As a result of repeated filtering with this simple mean filter, the weight becomes no longer a simple mean.

Figures 15, 16, 17:
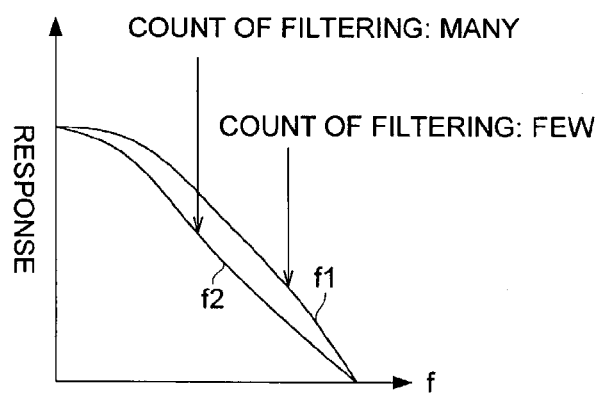
FIG. 15 is an explanatory figure on an embodiment example of the present invention.
FIG. 16 is an explanatory figure on an embodiment example of the present invention.
FIG. 17 is an explanatory figure on an embodiment example of the present invention.

FIG. 15 shows the relationship (in a state with no normalization) between the distribution in 8-cycle count repeated processing with a simple mean filter and the Gaussian distribution. The upper line shows the filtering weight in the repeated processing with a simple mean filter for 8 cycles, and the lower line shows the Gaussian distribution with the dispersion factor=2. By comparing these two, it is understood that the weight factor resembles to the Gaussian distribution.

In this embodiment example, by repeated filtering with a simple mean filter as shown in FIG. 14, filtering processing can be performed faster than when a conventional weighting filter is employed, and high-speed processing becomes possible even for an algorism, such as a pyramid algorism, that requires repeated filtering processing. In addition, while, in a prior art, the mask must be exchanged when the frequency characteristic needs to be changed, the frequency characteristic can be changed simply by changing the number of filtering processing with a simple mean filter, without changing the mask, in the present embodiment example. In other words, the frequency characteristic can be controlled by specifying the number of repeated simple-mean processing.

The mask to be applied shall be a 2×2 simple mean filter as shown in FIG. 14, and unsharp image signal can be generated through repeated filtering with this filter. This mask has a characteristic that the result of repeated filtering with this mask comes closer to that of a Gaussian mask. For example, two cycles of masking processing with this mask is equal to the masking processing with a weighted filter shown in FIG. 16(b).

Repeating the filtering processing with this mask for more cycles causes higher equalization and, therefore, the frequency characteristic of the unsharp image signal exhibits a profile where high frequencies are dropped off. FIG. 17 shows the cycle count of the filtering processing and the response. Horizontal axis is the frequency f and vertical axis is the response. A characteristic as shown by f1 in FIG. 17 is exhibited when the cycle count of the repeated filtering is small but a characteristic as shown by f2 in FIG. 17 is exhibited when the cycle count of the repeated filtering is big. When the cycle count of the repeated filtering is big, high-frequency component signals are dropped off and the frequency characteristic is lower.

Second Embodiment Example: Method of Decomposing Original Image Signal into Each Frequency Band In this second embodiment example, a multi-resolution method for decomposing an original image signal into each frequency band is applied. It is a method, where multiple unsharp image signals having different sharpness level, that is, different frequency response characteristics from an original image signal are generated, and multiple limited-band image signals (hereinafter called band pass signals) that represent the frequency components of limited frequency bands of the original image signal are generated by calculating the differential between two signal values out of the unsharp image signals and original image signal. Then, the band pass signals are restricted to a desired size using each specific function, and an add signal is generated by integrating the multiple restricted band pass signals.

Figure 19:
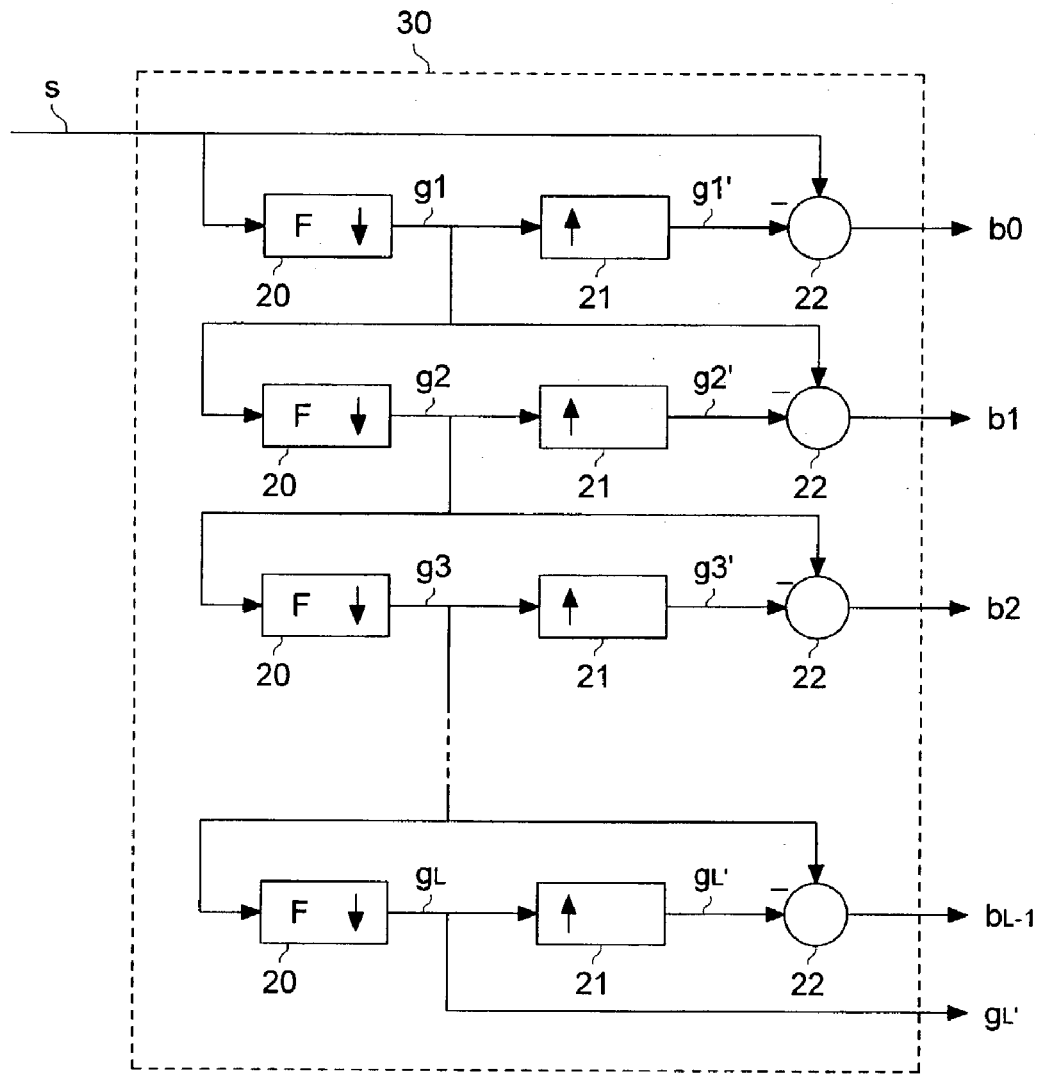
FIG. 19 is an explanatory figure on an embodiment example of the present invention.

To start with, explanation below is made on the pyramid algorism based on which the present embodiment example is applicable. FIG. 19 is a block diagram showing an example construction of the decomposing section that performs the pyramid algorism. In FIG. 19, symbol ↑ shows interpolation, ↓ shows down sampling, and F shows filtering.

In the second embodiment example, the conversion processing, to be described later, is performed on the unsharp image signal or differential image signal obtained from the pyramid algorism. Pyramid algorism is an algorism where an image signal with the resolution corresponding to the frequency component signal is generated and processed by down-sampling an image. For this reason, in this invention, having different resolution means that the image obtained by the pyramid algorism has different resolution.

As shown in FIG. 19, when a digital image signal S representing an original signal is inputted into a multi-resolution decomposition processing means 30, it is filtered with a low pass filter in a filtering means 20. The original image signal S, subjected to filtering with this filter, is sampled (down sampling) by every other pixel in the filtering means 20, and a low-resolution approximate image signal g1 is obtained.

The low-resolution approximate image signal g1 has a ¼ size of the original image signal S. Then, in an interpolating means 21, interpolation processing is performed into the sampled space of the low-resolution approximate image signal g1. The interpolation processing is, for example, to insert a row and a column comprising 0 into every other row and every other column of the low-resolution approximate image signal g1, respectively.

The low-resolution approximate image signal g1 interpolated with pixels comprising 0 as above is a blurred image, but, because a pixel comprising 0 is inserted between every other pixel, change of the signal value is no longer smooth.

Then, after the interpolation as above, the low-resolution approximate image signal g1 is again subjected to the filtering processing with the low pass filter and another low-resolution approximate image signal g1' is obtained. When compared with the above low-resolution approximate image signal g1 subjected to the interpolation processing, change of the signal value of this low-resolution approximate image signal g1' is smoother.

Instead of filtering with a low pass filter after interpolation processing with 0 is performed as above, it is acceptable that an interpolation processing is first performed on the columns by linear interpolation, spline interpolation, or weighting in accordance with the sampling function and then a similar processing is performed on the rows.

When compared with the original image signal in terms of frequency band, the obtained image signal is such that frequencies higher than a half are lost.

Then, in a subtracter 22, the low-resolution approximate image signal g1' is subtracted from the original image signal S, and a differential image signal b0 is obtained.

This subtraction is performed between the signals of the pixels of the original image signal S and low-resolution approximate image signal g1' corresponding to each other. Because, as explained above, the image of the low-resolution approximate image signal g1' seems blurred in the frequency bands higher than a half of the spatial frequency of the original image signal, the differential image signal b0 turns to be an image signal that represents only the frequency bands higher than a half of the original image signal.

Next, the low-resolution approximate image signal g1 is inputted into the filtering means 20 and subjected to the filtering processing with the low pass filter.

Then, the low-resolution approximate image signal g1, subjected to filtering, is sampled by every other pixel in the filtering means 20, and a low-resolution approximate image signal g2 is obtained. The low-resolution approximate image signal g2 has a ¼ size of the low-resolution approximate image signal g1, that is, a 1/16 size of the original image signal S.

Then, in the interpolating means 21, interpolation processing is performed into the sampled space of the low-resolution approximate image signal g2.

The interpolation processing is, for example, to insert a row and a column comprising 0 into every other row and every other column of the low-resolution approximate image signal g2, respectively. The low-resolution approximate image signal g2 interpolated with pixels comprising 0 as above is a blurred image, but, because a pixel comprising 0 is inserted between every other pixel, change of the signal value is no longer smooth.

Then, after the interpolation as above, the low-resolution approximate image signal g2 is again subjected to the filtering processing with the low pass filter and another low-resolution approximate image signal g2' is obtained. When compared with the above low-resolution approximate image signal g2 subjected to the interpolation processing, change of the signal value of this low-resolution approximate image signal g2' is smoother.

Instead of filtering with a low pass filter after interpolation processing with 0 is performed as above, it is acceptable that an interpolation processing is first performed on the columns by linear interpolation, spline interpolation, or weighting in accordance with the sampling function and then a similar processing is performed on the rows.

When compared with the low-resolution approximate image signal g1 in terms of frequency band, the obtained image signal is such that frequencies higher than a half are lost.

Then, in the subtracter 22, the low-resolution approximate image signal g2' is subtracted from the low-resolution approximate image signal g1, and a differential image signal b1 is obtained.

This subtraction is performed between the signals of the pixels of the low-resolution approximate image signal g1 and low-resolution approximate image signal g2' corresponding to each other. Because, as explained above, the image of the low-resolution approximate image signal g2' seems blurred in the frequency bands higher than a half of the spatial frequency of the low-resolution approximate image signal g1, the differential image signal b1 turns to be an image signal that represents only the frequency bands higher than a half of the low-resolution approximate image signal g1.

Figure 20:
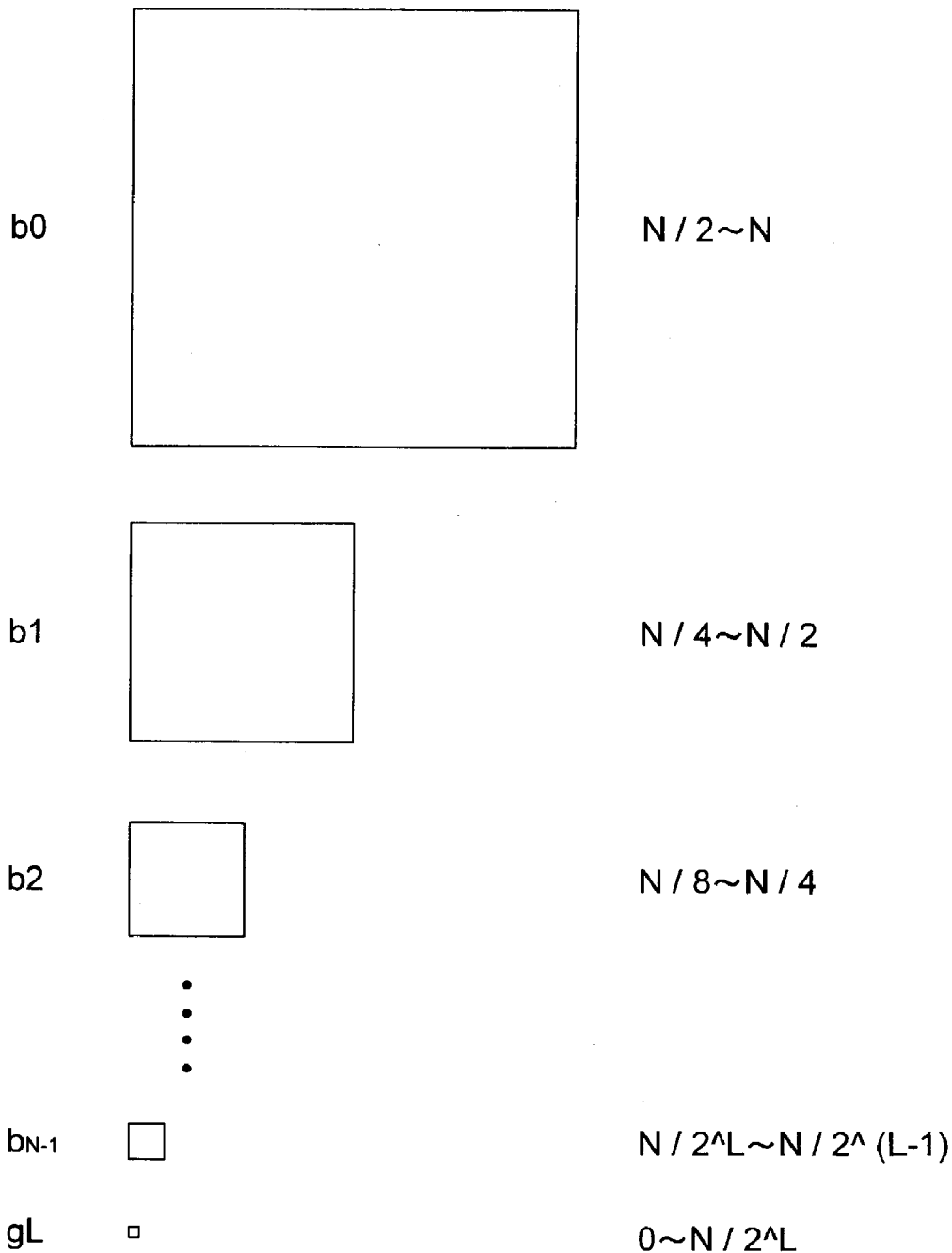
FIG. 20 is an explanatory figure on an embodiment example of the present invention.

In other words, as shown in FIG. 20, the differential image signal b1 is an image signal that represents only the frequency bands higher than a half of the low-resolution approximate image signal g1, that is, only the frequency bands from N/4 to N/2 of the Nyquist frequency N of the original image signal. Although the differential image signal is obtained through the filtering processing with a low pass filter, the result is practically the same as obtained through the filtering processing with a Laplacian filter because the filtered image signal is subtracted from the low-resolution approximate image signal.

Then, the above processing is repeated on the filtered and sampled low-resolution approximate image signal gk (K=0 to L−1) one after another to obtain L-number of differential image signal bk (k=0 to L−1) and residual image signal gL of the low-resolution approximate image signal. The differential image signal bk exhibits lower resolution in sequence starting from b0. This is because the frequency band of the image signal becomes lower, and, when compared with the Nyquist frequency of the original image signal, the differential image signal bk has the frequency band of N/2^(k+1) to N/2^k and the image signal size is ½^(2k) times the original image signal.

In other words, the size of the differential image signal b0 that exhibits the highest resolution is the same as the original image signal but that of the differential image signal b1 that exhibits the next highest to the differential image signal b0 is ¼ of the original image signal.

Because the differential image signal size becomes smaller in sequence starting from the same size as of the original image signal and the differential image signal is practically the same image signal as obtained through the processing with a Laplacian filter, the multi-resolution conversion in the second embodiment example is sometimes called the Laplacian pyramid algorism.

The residual image signal gL can be regarded as an approximate image signal of the original image signal with very low resolution and, in an extreme case, the residual image signal gL may comprise a single image signal representing a mean of the original image signal.

Herein, the residual image signal gL, which is equivalent to the lowest frequency image signal, means an image signal that is obtained as a result of the L-th filtering processing when the pyramid algorism is performed on the original image signal and the filtering processing is repeated 1 to L-number of times.

Then, the differential image signal bk obtained as above is stored in a memory, not known. And then, the image conversion processing, to be described later, is performed on g1', g2', g3', . . . , which is the output from the interpolating means 21 shown in FIG. 19, or on b0, b1, b2, . . . . These unsharp image signals g1', g2', g3', . . . are unsharp signals of multiple frequency bands having different frequency characteristic.

The differential image signal generated from the unsharp image signal subjected to the conversion processing or the differential image signal subjected to the conversion processing are now converted inversely. This inverse conversion processing is performed in a recovery processing means 40.

Figure 21:
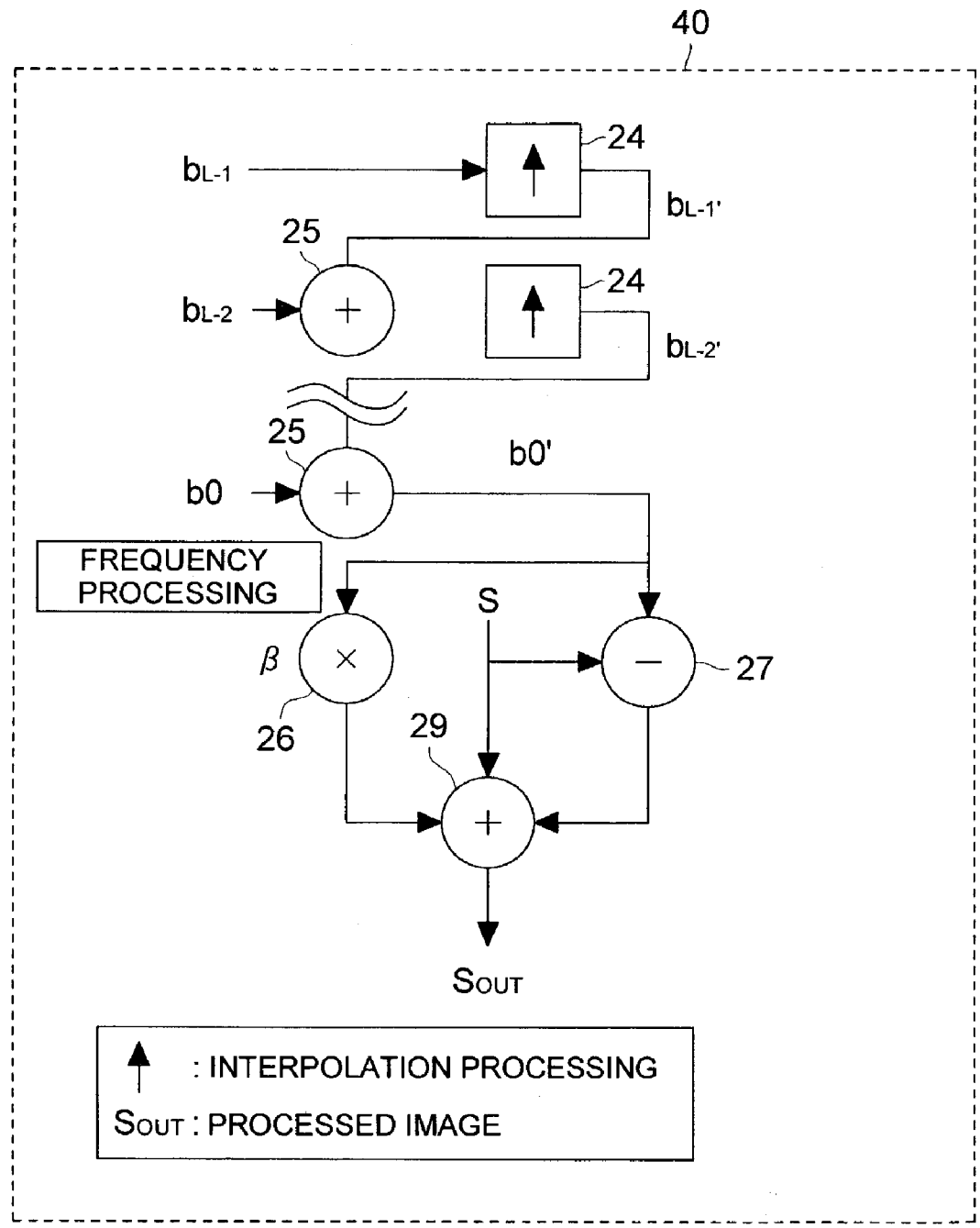
FIG. 21 is an explanatory figure on an embodiment example of the present invention.

FIG. 21 is a block diagram showing an example construction of the recovery section that performs the pyramid algorism. The image signals to be processed in this example are b0 to bL-1. First, the image signal bL-1 is interpolated by insertion between each pixel by the interpolating means 24 and turns to an image signal bL-1' with 4 times the size of the previous size. Then, in an adder 25, the interpolated image signal bL-1' is added to the lowest resolution differential image signal bL-2 between the pixels corresponding to each other, and the added image signal (bL-1'+bL-2) is obtained.

Next, the added image signal (bL-1'+bL-2) is inputted into the interpolating means 24, and then interpolated by insertion between each pixel by the interpolating means 24 and turns to an image signal bL-2' with 4 times the size of the previous size. Then, in the adder 25, the image signal bL-2' is added to the differential image signal bL-3, which has higher resolution than the differential image signal bL-2 by one rank, between the pixels corresponding to each other. And then, the added image signal (bL-2'+bL-3) is interpolated by insertion between each pixel by the interpolating means 24 and turns to an image signal bL-3' with 4 times the size of the differential image signal bL-3.

The same processing is repeated thereafter. This processing is performed sequentially on higher frequency differential image signal and, finally, the differential image signal b0' interpolated in the adder 25 is multiplied by β in a multiplier 26 and then added to the original image signal S in an adder 29 to obtain the processed image signal Sout (frequency exaggeration processing).

As explained in the preferred embodiment, it is possible to realize an image processing method and an image converting apparatus that can provide image in stable quality irrespective of the difference in the density of image to be recorded or difference in the conversion characteristic of each device.

Disclosed embodiment can be varied by a skilled person without departing from the spirit and scope of the invention.

What is claimed is:

1. A method for processing original image signals of an image composed of a plurality of pixels, said method comprising the steps of:

converting said image in respect to said original image signals;

extracting image features for every pixel included in said plurality of pixels in respect to said original image signals; and performing a frequency processing operation for compensating for a sharpness level of said image, based on said image features extracted in said extracting step, so as to reduce a variation of said sharpness level before and after said converting step;

wherein said converting step is performed after applying an image interpolation processing to said original image signals; and wherein, when an interpolating-magnification factor of said image interpolation processing is equal to or greater than a predetermined value, said image interpolation processing is performed after performing said frequency processing operation, while, when said interpolating-magnification factor of said image interpolation processing is smaller than said predetermined value, said frequency processing operation is performed after performing said image interpolation processing.

2. The method of claim 1,
wherein said image is a medical image.

3. The method of claim 1,
wherein said frequency processing operation for compensating for said sharpness level of said image is performed so that frequency characteristics before and after said converting step coincide with each other in a predetermined frequency range.

4. The method of claim 3,
wherein said predetermined frequency is in a range of 0–3.0 cycle/mm.

5. A method for processing original image signals of an image composed of a plurality of pixels, said method comprising the steps of:

converting said image in respect to said original image signals;

obtaining sharpness information from an image converting apparatus by which said converting step is performed; and performing a frequency processing operation for compensating for a sharpness level of said image, based on said sharpness information obtained in said obtaining step, so as to reduce a variation of said sharpness level before and after said converting step;

wherein said converting step is performed after applying an image interpolation processing to said original image signals; and wherein, when an interpolating-magnification factor of said image interpolation processing is equal to or greater than a predetermined value, said image interpolation processing is performed after performing said frequency processing operation, while, when said interpolating-magnification factor of said image interpolation processing is smaller than said predetermined value, said frequency processing operation is performed after performing said image interpolation processing.

6. The method of claim 5,
wherein said image is a medical image.

7. The method of claim 5,
wherein said sharpness information relate to at least one of SWTF, MTF and ARTF.

8. A method for processing original image signals of an image composed of a plurality of pixels, said method comprising the steps of:

converting said image in respect to said original image signals;

extracting image features for every pixel included in said plurality of pixels in respect to said original image signals;

obtaining sharpness information from an image converting apparatus by which said converting step is performed;

calculating correlation between said image features and said sharpness information; and performing a frequency processing operation for compensating for a sharpness level of said image, based on said con-elation calculated in said calculating step, so as to reduce a variation of said sharpness level before and after said converting step;

wherein said converting step is performed after applying an image interpolation processing to said original image signals; and wherein, when an interpolating-magnification factor of said image interpolation processing is equal to or greater than a predetermined value, said image interpolation processing is performed after performing said frequency processing operation, while, when said interpolating-magnification factor of said image interpolation processing is smaller than said predetermined value, said frequency processing operation is performed after performing said image interpolation processing.

9. The method of claim 8,
wherein said image is a medical image.

10. The method of claim 8,
wherein a neural network is employed for said calculating step.

11. A method for processing original image signals of an image composed of a plurality of pixels, said method comprising the steps of:

converting said image in respect to said original image signals;

extracting image features for every pixel included in said plurality of pixels in respect to said original image signals;

obtaining sharpness information from an image converting apparatus by which said converting step is performed;

calculating cogitation between said image features and said sharpness information; and performing a frequency processing operation for compensating for a sharpness level of said image, based on said con-elation calculated in said calculating step, so as to reduce a variation of said sharpness level before and after said converting step;

wherein said frequency processing operation is performed, based on a formula of, $$Snew = \Sigma CmSm$$

where $m = 0, \ldots, M$. M: natural number,
Snew: processed image signal;
Sin: original image signal (when $m=0$) or unsharp image signal generated though a m-th unsharp masking processing (when $m=1$ to M),
Cm: weight factor in the original image signal (when $m=0$) or weight factor in the m-th unsharpe image signal (when $m=1$ to M)).

12. The method of claim 11,
wherein said weight factor is determined, based on said image features or said sharpness information.

13. The method of claim 11,
wherein said weight factor is determined so as to keep ΣCm at a constant value.

14. The method of claim 11,
wherein said frequency processing is applied to image signals generated from a mammographic image by employing at least three unsharp masks, modulation transfer functions of which are different from each other.

15. A method for processing original image signals of an image composed of a plurality of pixels, said method comprising the steps of:
converting said image in respect to said original image signals;
repeatedly applying an unsharp mask processing to said original image signals of said image, composed of said plurality of pixels, to create plural sets of unsharp image signals, resolutions of which are different from each other;
acquiring first differential image signals between said original image signals and unsharp image signals created by applying said unsharp mask processing to said original image signals once;
acquiring a single set or plural sets of second differential image signals between said plural sets of unsharp image signals;
applying a weighted add-subtract processing to said first differential image signals and said single set or plural sets of second differential image signals, so as to generate processed image signals; and
performing a frequency processing operation for compensating for a sharpness level of said image, by changing a modulation transfer function with respect to said unsharp mask processing, so as to reduce a variation of said sharpness level before and after a step of converting said image in respect to said original image signals;
wherein said converting step is performed after applying an image interpolation processing to said original image signals; and
wherein, when an interpolating-magnification factor of said image interpolation processing is equal to or greater than a predetermined value, said image interpolation processing is performed after performing said frequency processing operation, while, when said interpolating-magnification factor of said image interpolation processing is smaller than said predetermined value, said frequency processing operation is performed after performing said image interpolation processing.

16. The method of claim 15,
wherein said image is a medical image.

17. The method of claim 15,
wherein said frequency processing is applied to image signals generated from a mammographic image by employing at least three unsharp masks, modulation transfer functions of which are different from each other.

18. The method of claim 15,
wherein said unsharp mask processing is repeated processing with a specific mask.

19. The method of claim 18,
wherein said specific mask is a simple mean mask.

20. The method of claim 18,
wherein said specific mask is a simple mean mask of 2-pixels by 2-pixels.

21. An apparatus for processing original image signals of an image composed of a plurality of pixels, said apparatus comprising:
an image converting section to convert said image in respect to said original image signals;
an image feature extracting section to extract image features for every pixel included in said plurality of pixels in respect to said original image signals; and
a frequency processing section to compensate for a sharpness level of said image, based on said image features extracted by image feature extracting section, so as to reduce a variation of said sharpness level before and after said image converting section converts said image in respect to said original image signals;
wherein said image converting section converts said image in respect to said original image signals after applying an image interpolation processing to said original image signals; and
wherein, when an interpolating-magnification factor of said image interpolation processing is equal to or greater than a predetermined value, said image interpolation processing is performed after performing said frequency processing operation, while, when said interpolating-magnification factor of said image interpolation processing is smaller than said predetermined value, said frequency processing operation is preformed after performing said image interpolation processing.

22. The apparatus of claim 21,
wherein said image is a medical image.

23. The apparatus of claim 21,
wherein said frequency processing section compensates for said sharpness level of said image, so that frequency characteristics, before and after said image converting section converts said image in respect to said original image signals, coincide with each other in a predetermined frequency range.

24. The apparatus of claim 23,
wherein said predetermined frequency is in a range of 0–3.0 cycle/mm.

25. An apparatus for processing original image signals of an image composed of a plurality of pixels, said apparatus comprising:
an image converting section to convert said image in respect to said original image signals;
a sharpness information obtaining section to obtain sharpness information from said image converting section; and
a frequency processing section to compensate for a sharpness level of said image, based on said sharpness information obtained by said sharpness information obtaining section, so as to reduce a variation of said sharpness level before and after said image converting section converts said image in respect to said original image signals;
wherein said image converting section converts said image in respect to said original image signals after applying an image interpolation processing to said original image signals; and
wherein, when an interpolating-magnification factor of said image interpolation processing is equal to or greater than a predetermined value, said image interpolation processing is performed after performing said frequency processing operation, while, when said interpolating-magnification factor of said image interpolation processing is smaller than said predetermined value, said frequency processing operation is performed after performing said image interpolation processing.

26. The apparatus of claim 25,
wherein said image is a medical image.

27. The apparatus of claim 25,
wherein said sharpness information relate to at least one of SWTF, MTF and ARTF.

28. An apparatus for processing original image signals of an image composed of a plurality of pixels, said apparatus comprising:
an image converting section to convert said image in respect to said original image signals;
an image feature extracting section to extract image features for every pixel included in said plurality of pixels in respect to said original image signals;
a sharpness information obtaining section to obtain sharpness information from said image converting section;
a sharpness calculating section to calculate correlation between said image features and said sharpness information; and
a frequency processing section to compensate for a sharpness level of said image, based on said correlation calculated by said sharpness calculating section, so as to reduce a variation of said sharpness level before and after said image converting section converts said image in respect to said original image signals;
wherein said image converting section converts said image in respect to said original image signals after applying an image interpolation processing to said original image signals; and
wherein, when an interpolating-magnification factor of said image interpolation processing is equal to or greater than a predetermined value, said image interpolation processing is performed after performing said frequency processing operation, while, when said interpolating-magnification factor of said image interpolation processing is smaller than said predetermined value, said frequency processing operation is performed after performing said image interpolation processing.

29. The apparatus of claim 28,
wherein said image is a medical image.

30. The apparatus of claim 28,
wherein a neural network is employed for said sharpness calculating section.

31. An apparatus for processing original image signals of an image composed of a plurality of pixels, said apparatus comprising:
an image convex-ting section to convert said image in respect to said original image signals;
an image feature extracting section to extract image features for every pixel included in said plurality of pixels in respect to said original image signals;
a sharpness information obtaining section to obtain sharpness information from said image converting section;
a sharpness calculating section to calculate correlation between said image features and said sharpness information; and
a frequency processing section to compensate for a sharpness level of said image, based on said correlation calculated by said sharpness calculating section, so as to reduce a variation of said sharpness level before and after said image converting section converts said image in respect to said original image signals;

wherein said frequency processing section compensates for said sharpness level of said image, based on a formula of, $$Snew = \Sigma C_m S_m$$

where m=0, . . . , M. M: natural number,
Snew: processed image signal;
Sm: original image signal (when m=0) or unsharp image signal generated through a m-th unsharp masking processing (when m=1 to M),
Cm: weight factor in the original image signal (when m=0) or weight factor in the m-th unsharpe image signal (when m=1 to M)).

32. The apparatus of claim 31,
wherein said weight factor is determined, based on said image features or said sharpness information.

33. The apparatus of claim 31,
wherein said weight factor is determined so as to keep ΣCm at a constant value.

34. The apparatus of claim 31,
wherein said frequency processing section applies frequency processing to image signals generated from a mammographic image by employing at least three unsharp masks, modulation transfer functions of which are different from each other.

35. An apparatus for processing original image signals of an image composed of a plurality of pixels, said apparatus comprising:
an image converting section to convert said image in respect to said original image signals;
an unsharp mask processing section to repeatedly apply an unsharp mask processing to said original image signals of said image, composed of said plurality of pixels, to create plural sets of unsharp image signals, resolutions of which are different from each other;
a first acquiring section to acquire first differential image signals between said original image signals and unsharp image signals created by applying said unsharp mask processing to said original image signals once;
a second acquiring section to acquire a single set or plural sets of second differential image signals between said plural sets of unsharp image signals;
a weighted add-subtract processing section to apply a weighted add-subtract processing to said first differential image signals and said single set or plural sets of second differential image signals, so as to generate processed image signals; and
a frequency processing section to compensate for a sharpness level of said image, by changing a modulation transfer function with respect to said unsharp mask processing, so as to reduce a variation of said sharpness level before and after said image converting section converts said image in respect to said original image signals;
wherein said image converting section converts said image in respect to said original image signals after applying an image interpolation processing to said original image signals; and
wherein, when an interpolating-magnification factor of said image interpolation processing is equal to or greater than a predetermined value, said image interpolation processing is preformed after performing said frequency processing operation, while, when said interpolating-magnification factor of said image interpolation processing is smaller than said predetermined value, said frequency processing operation is performed after performing said image interpolation processing.

36. The apparatus of claim 35,
wherein said image is a medical image.

37. The apparatus of claim 35,
wherein said frequency processing section applies frequency processing to image signals generated from a mammographic image by employing at least three unsharp masks, modulation transfer functions of which are different from each other.

38. The apparatus of claim 35,
wherein said unsharp mask processing is repeated processing with a specific mask.

39. The apparatus of claim 38,
wherein said specific mask is a simple mean mask.

40. The apparatus of claim 38,
wherein said specific mask is a simple mean mask of 2-pixels by 2-pixels.

* * * * *